US011396055B2

United States Patent
Naoi et al.

(10) Patent No.: US 11,396,055 B2
(45) Date of Patent: Jul. 26, 2022

(54) RECIPROCATING TOOL

(71) Applicant: MAKITA CORPORATION, Anjo (JP)

(72) Inventors: Yosuke Naoi, Anjo (JP); Akihito Hara, Anjo (JP); Yasushi Ogura, Anjo (JP); Wei Yang, Kunshan (CN); Pengfei Yang, Kunshan (CN); Hao Wei Mei, Kunshan (CN); Tomohiro Ukai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/787,503

(22) Filed: Feb. 11, 2020

(65) Prior Publication Data

US 2020/0282482 A1 Sep. 10, 2020

(30) Foreign Application Priority Data

Mar. 4, 2019 (JP) .............................. JP2019-038716

(51) Int. Cl.
*B23D 59/04* (2006.01)
*B23D 49/10* (2006.01)
*B23D 49/16* (2006.01)

(52) U.S. Cl.
CPC ........... *B23D 59/04* (2013.01); *B23D 49/105* (2013.01); *B23D 49/162* (2013.01); *Y10T 83/293* (2015.04); *Y10T 83/9481* (2015.04)

(58) Field of Classification Search
CPC ...... B23D 59/02; B23D 29/025; B23D 59/04; B23D 49/105; B23D 49/162;

(Continued)

(56) References Cited

U.S. PATENT DOCUMENTS 3,146,810 A * 9/1964 Keesling ................ B23D 51/10
30/394
3,170,496 A * 2/1965 Kohler ................ B23D 49/162
30/392

(Continued)

FOREIGN PATENT DOCUMENTS

| CN | 202207836 U | * | 5/2012 | ............. B23D 59/00 |
| CN | 106862661 A | * | 6/2017 | ............. B23D 49/16 |
| JP | H06-079701 A | | 3/1994 | |

OTHER PUBLICATIONS

CN-106862661-A English Translation; Jun. 2017; Liu Lai B23D49/16.*

*Primary Examiner* — Laura M Lee
(74) *Attorney, Agent, or Firm* — Oliff PLC

(57) ABSTRACT

A reciprocating tool easily supplies a lubricant, such as grease (lubricating oil), to a mechanism for reciprocating a slider, and prevents a lack of lubricant. A reciprocating saw as a reciprocating tool includes a motor, a reciprocating conversion mechanism that converts rotation of the motor to reciprocation, a slider connected to the reciprocating conversion mechanism and being reciprocable, and a slider guide that supports the slider in a reciprocable manner and includes a lubricant-passage member in contact with the slider to allow passage of at least part of a lubricant through the lubricant-passage member, and a lubricant reservoir located adjacent to the lubricant-passage member to store the lubricant.

12 Claims, 23 Drawing Sheets

(58) Field of Classification Search
CPC ............... Y10T 83/8881; Y10T 83/263; Y10T 74/18256; B25D 17/26
See application file for complete search history.

(56) References Cited

U.S. PATENT DOCUMENTS

| | | | | | |
|---|---|---|---|---|---|
| 3,461,732 | A | * | 8/1969 | Gregory | B23D 51/10 74/60 |
| 3,750,483 | A | * | 8/1973 | Burrows | B23D 51/16 74/50 |
| 3,796,271 | A | * | 3/1974 | Amtsberg | E21B 6/00 173/102 |
| 3,837,409 | A | * | 9/1974 | Consoli | B25D 17/26 173/48 |
| 3,929,195 | A | * | 12/1975 | Stiltz | B25D 17/26 173/109 |
| 3,971,132 | A | * | 7/1976 | Griffies | B23D 49/162 30/393 |
| 4,385,443 | A | * | 5/1983 | O'Banion | B23D 49/165 30/393 |
| 4,550,501 | A | * | 11/1985 | Moores, Jr. | B23D 49/165 30/393 |
| 4,611,670 | A | * | 9/1986 | Chromy | B25D 17/26 173/104 |
| 4,771,542 | A | * | 9/1988 | Beveridge | B23D 29/00 30/277.4 |
| 4,962,588 | A | * | 10/1990 | Fushiya | B23D 49/002 30/372 |
| 5,293,959 | A | * | 3/1994 | Kimberlin | B25D 17/265 173/71 |
| 5,450,925 | A | * | 9/1995 | Smith | B23D 49/165 184/5 |

* cited by examiner

RECIPROCATING TOOL

CROSS-REFERENCE TO RELATED APPLICATIONS

This application claims the benefit of priority to Japanese Patent Application No. 2019-038716, filed on Mar. 4, 2019, the entire contents of which are hereby incorporated by reference.

BACKGROUND

1. Technical Field

The present invention relates to a reciprocating tool.

2. Description of the Background

A known reciprocating saw described in Japanese Unexamined Patent Application Publication No. 6-79701 includes a slider 5 that reciprocates on front and rear oilless bearings 7 and 8 in the front-rear direction.

BRIEF SUMMARY

In the known reciprocating saw, the slider 5 and the oilless bearings 7 and 8 are in contact with each other. In this structure, less grease or lubricating oil in the grease is replenished between the slider 5 and the oilless bearings 7 and 8. The oilless bearings 7 and 8 and the slider 5 may wear due to oil film breakdown that may occur when the grease or lubricating oil is used up without replenished.

One or more aspects of the present invention are directed to a reciprocating tool including a mechanism for reciprocating a slider that easily supplies a lubricant such as grease (lubricating oil) and prevents a lack of lubricant.

A first aspect of the present invention provides a reciprocating tool, including:
 a motor;
 a reciprocating conversion mechanism configured to convert rotation of the motor to reciprocation;
 a slider connected to the reciprocating conversion mechanism, the slider configured to reciprocate; and
 a slider guide supporting the slider in a reciprocable manner, the slider guide including
  a lubricant-passage member in contact with the slider to allow passage of at least part of a lubricant through the lubricant-passage member, and
  a lubricant reservoir located adjacent to the lubricant-passage member to store the lubricant.

A second aspect of the present invention provides a reciprocating tool, including:
 a motor;
 a reciprocating conversion mechanism configured to convert rotation of the motor to reciprocation;
 a slider connected to the reciprocating conversion mechanism, the slider configured to reciprocate;
 a slider guide supporting the slider in a reciprocable manner, the slider guide being in contact with the slider to allow passage of at least part of a lubricant through the slider guide; and
 a housing accommodating the slider guide, and including a lubricant reservoir to store the lubricant.

The reciprocating tool according to the aspects of the present invention includes a mechanism for reciprocating a slider that easily supplies a lubricant such as grease (lubricating oil) and prevents a lack of lubricant.

DETAILED DESCRIPTION

Embodiments and modifications of the present invention will now be described with reference to the drawings as appropriate.

A reciprocating tool according to embodiments of the present invention is, for example, a reciprocating cutting tool, and more specifically, a reciprocating saw.

The directional terms such as front, rear, up, down, right, and left in the embodiments and the modifications are defined for ease of explanation, and may be changed depending on, for example, at least the operating situations or the status of a movable member.

The present invention is not limited to the embodiments and the modifications.

First Embodiment

Figure 1:
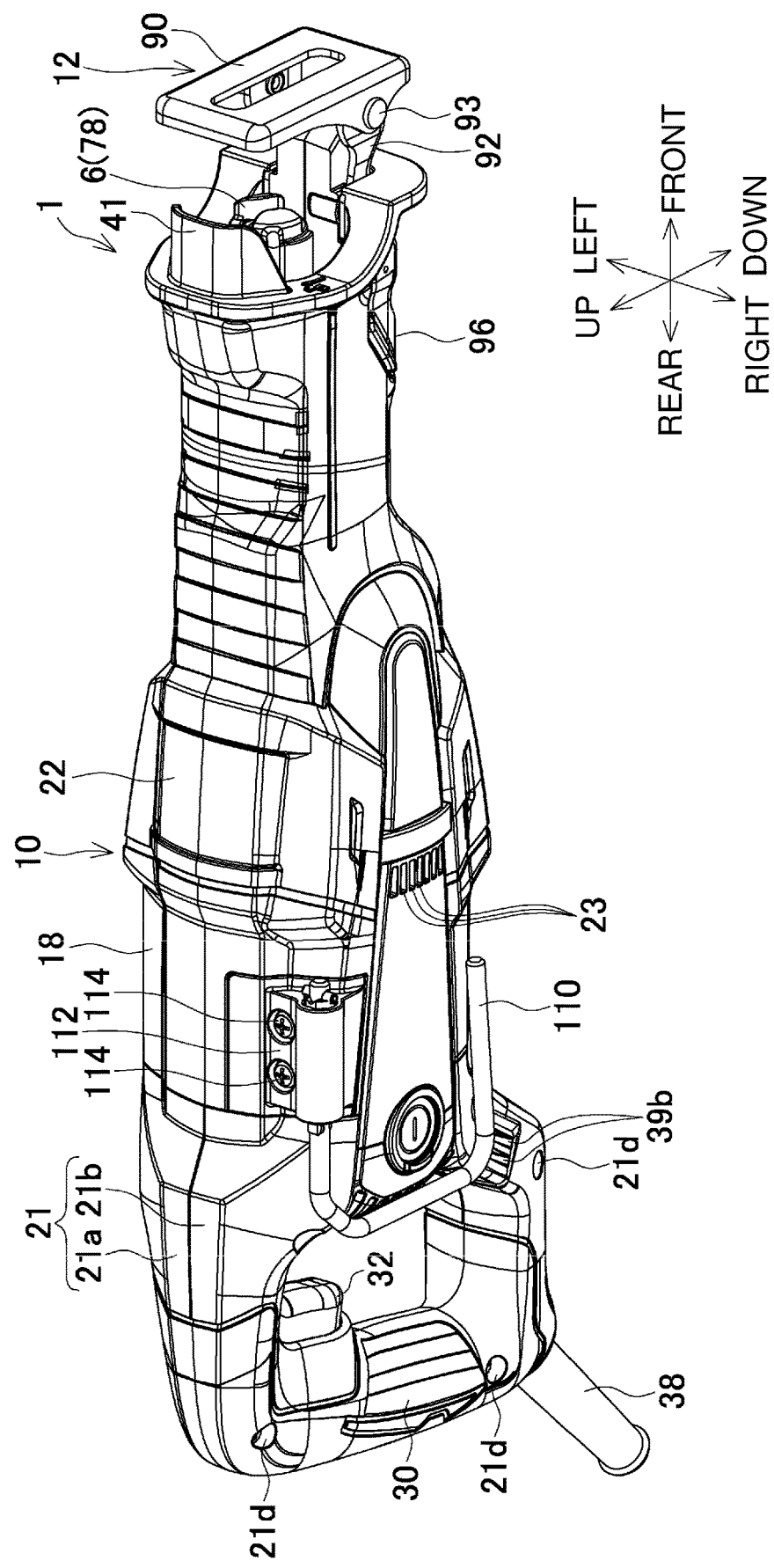
FIG. 1 is a perspective view of a reciprocating saw according to a first embodiment as viewed from the upper right front.
Figure 2:
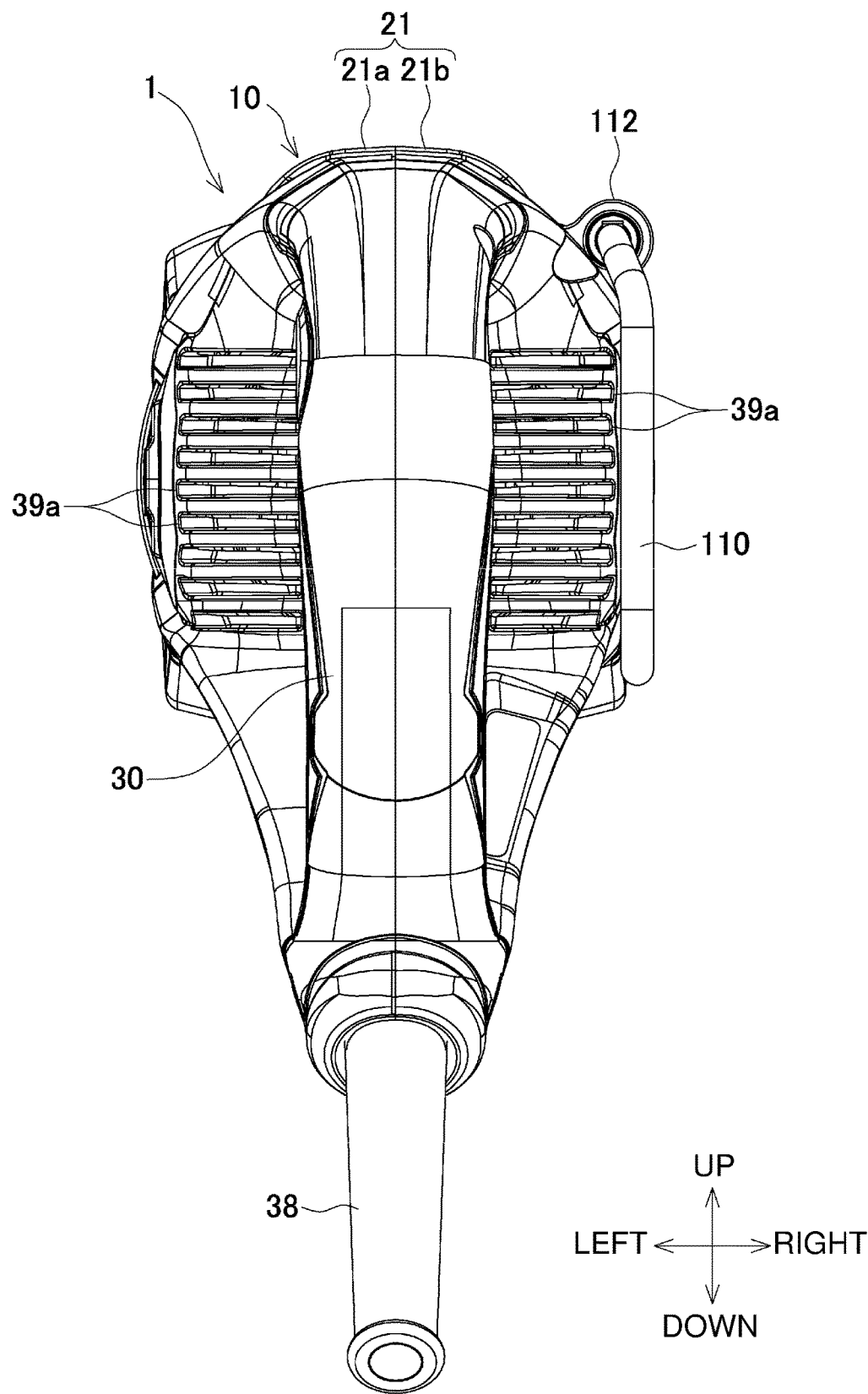
FIG. 2 is a rear view of the reciprocating saw.
Figure 3:
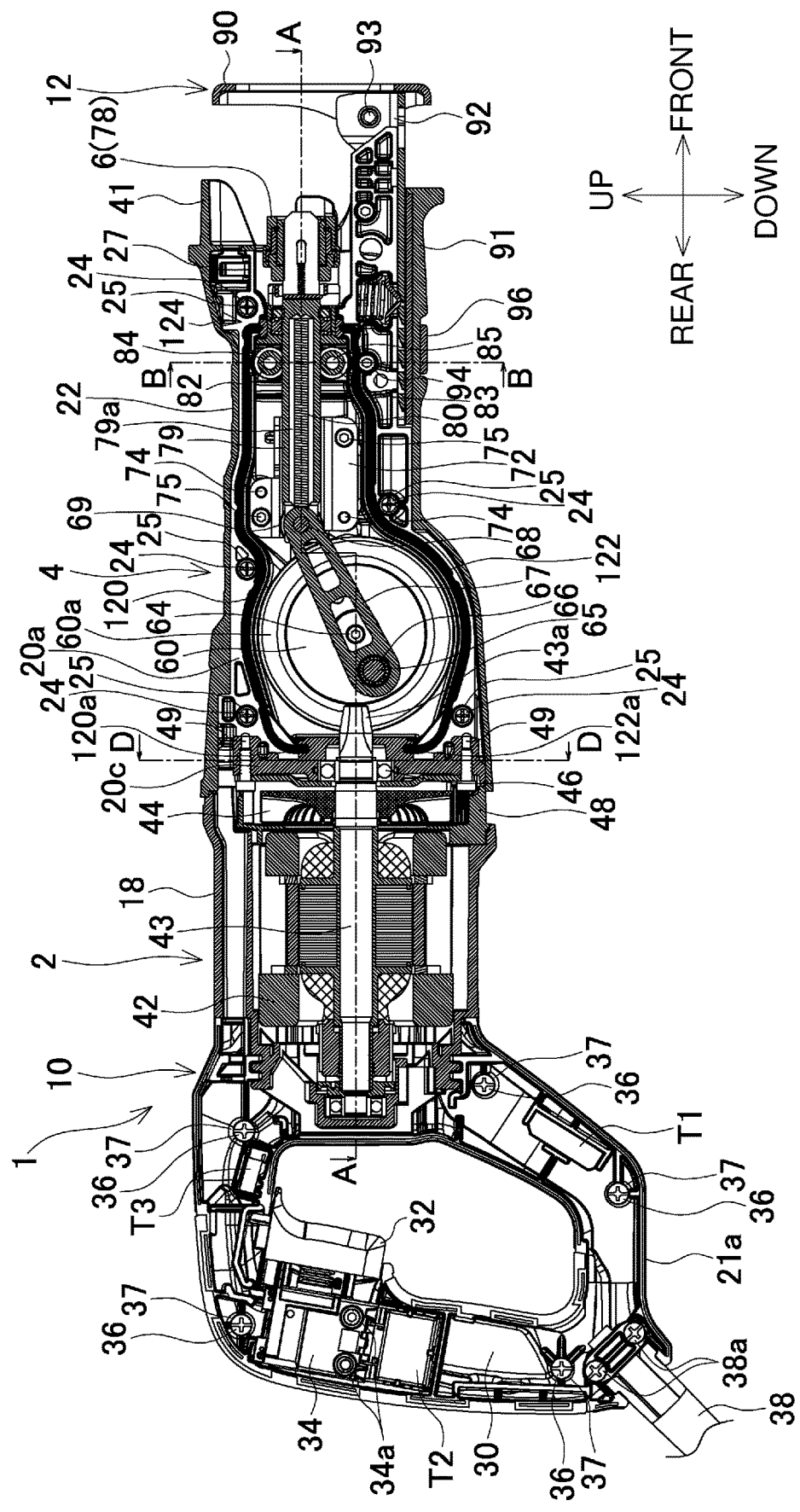
FIG. 3 is a longitudinal central sectional view of the reciprocating saw.
Figure 4:
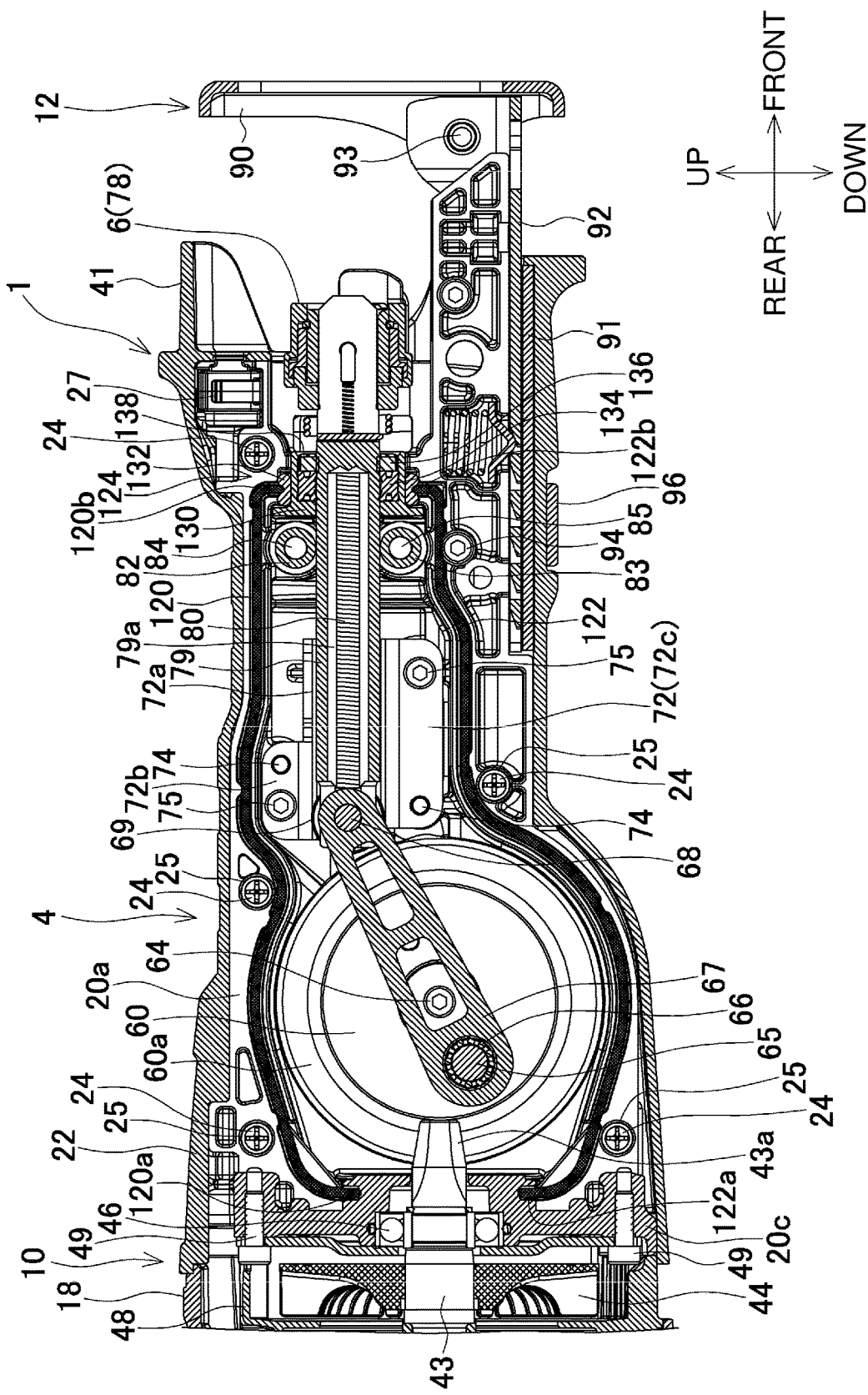
FIG. 4 is an enlarged partial view of a front portion in FIG. 3.
Figure 5:
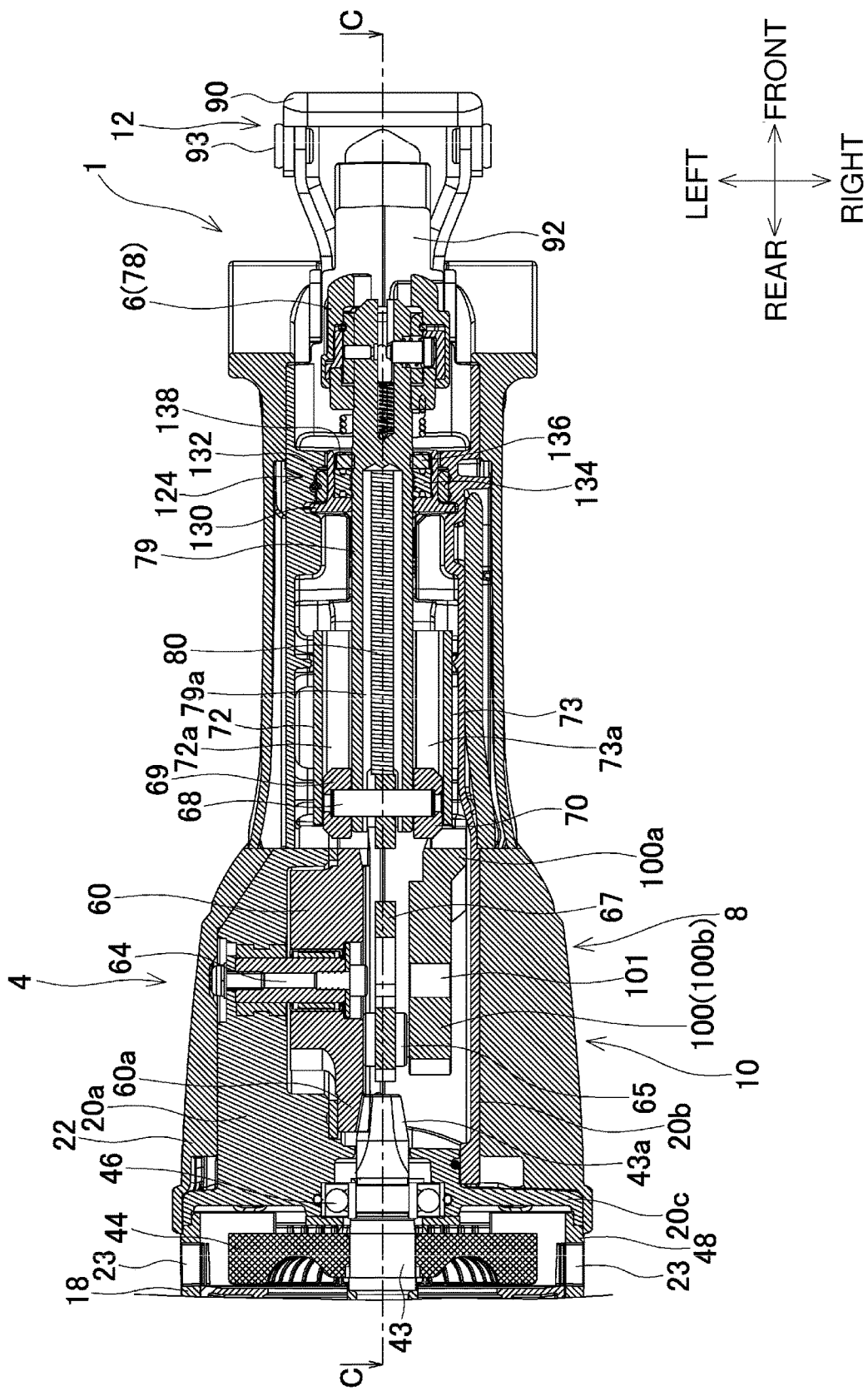
FIG. 5 is a cross-sectional view taken along line A-A in FIG. 3.
Figure 6:
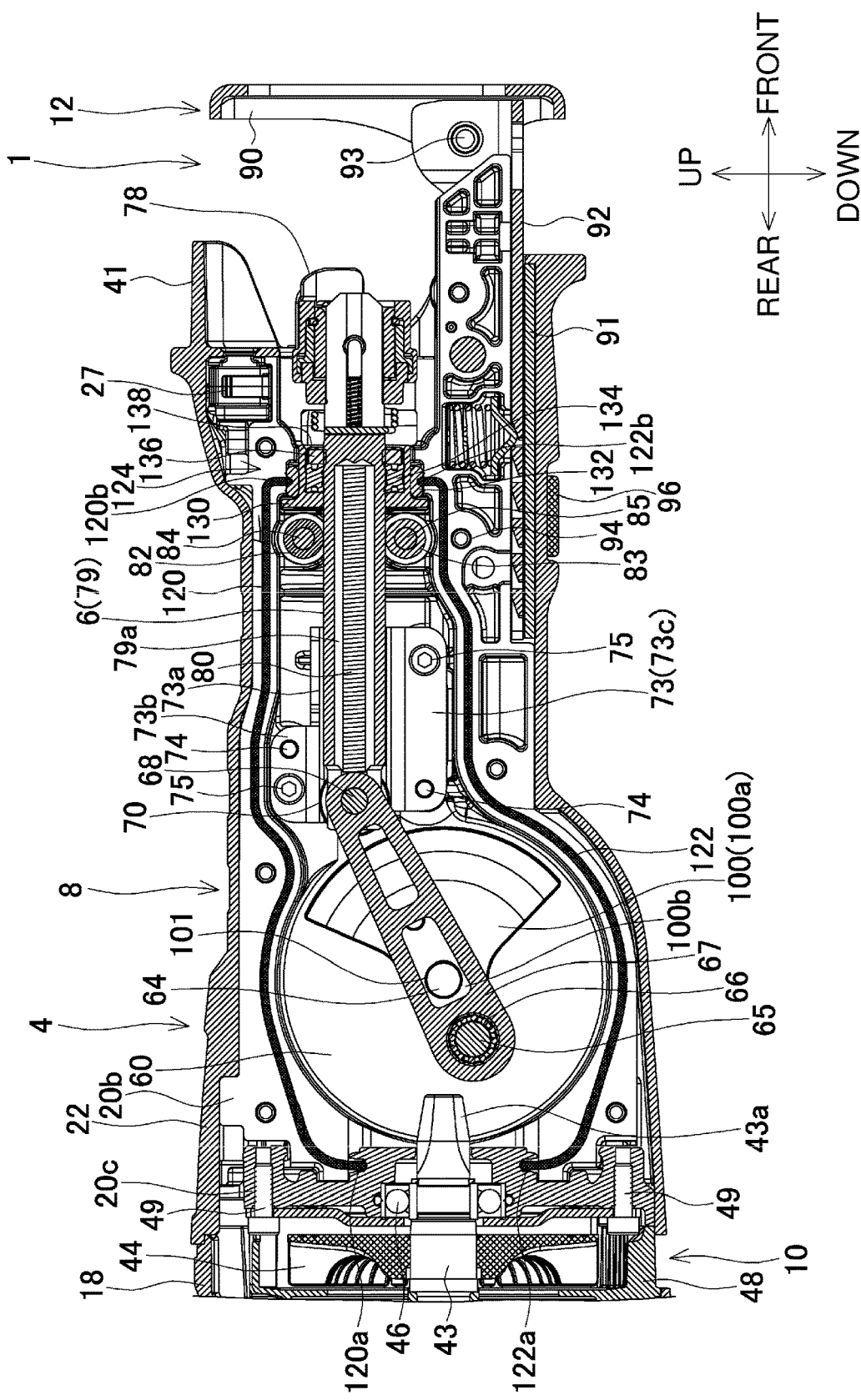
FIG. 6 is a longitudinal central sectional view of an opposite half (right half) of the portion shown in FIG. 4.
Figure 7:
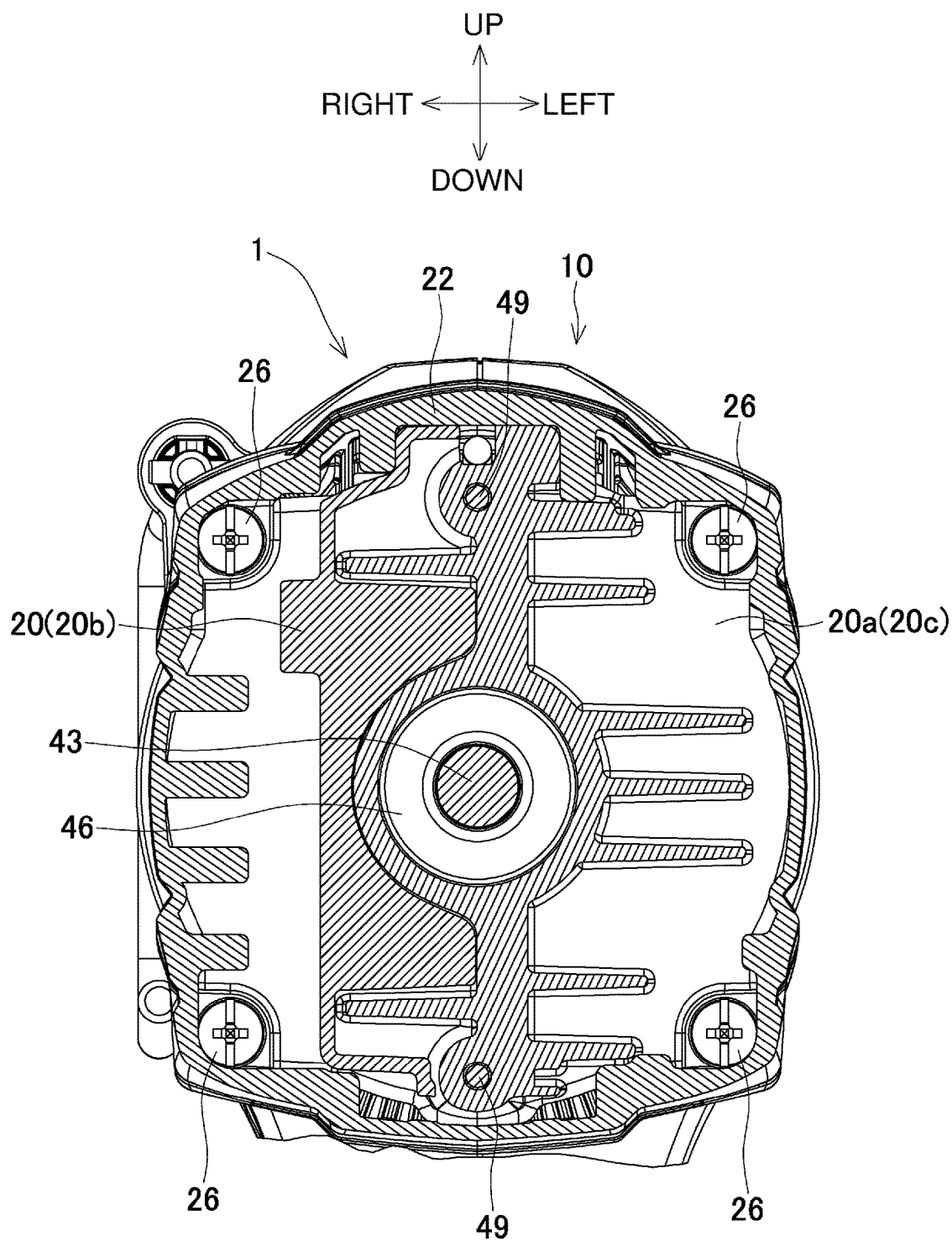
FIG. 7 is a cross-sectional view taken along line D-D in FIG. 3.
Figure 8:
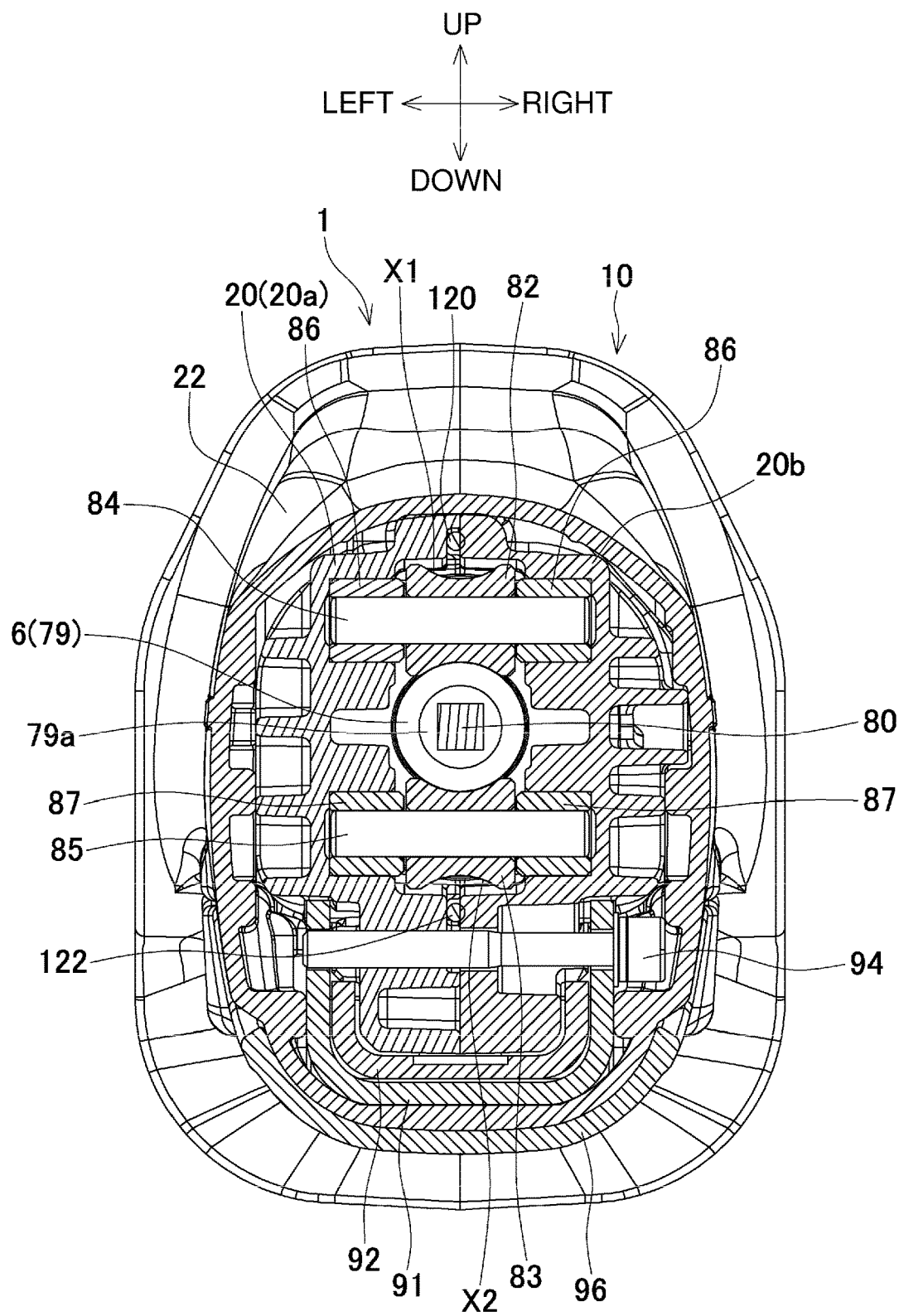
FIG. 8 is a cross-sectional view taken along line B-B in FIG. 3.

FIG. 1 is a perspective view of a reciprocating saw 1 according to a first embodiment. FIG. 2 is a rear view of the reciprocating saw in FIG. 1. FIG. 3 is a longitudinal central sectional view of the reciprocating saw in FIG. 1. FIG. 4 is an enlarged partial view of a front portion in FIG. 3. FIG. 5 is a cross-sectional view taken along line A-A in FIG. 3. FIG. 6 is a longitudinal central sectional view of an opposite half (right half) of the portion shown in FIG. 4. FIG. 7 is a cross-sectional view taken along line D-D in FIG. 3. FIG. 8 is a cross-sectional view taken along line B-B in FIG. 3.

The reciprocating saw 1 includes a power mechanism 2, a reciprocating conversion mechanism 4, a slider 6, a counterweight mechanism 8, a housing 10, and a guide shoe 12. The slider 6 is a final output unit connected to the reciprocating conversion mechanism 4. The counterweight mechanism 8 is combined with the reciprocating conversion mechanism 4. The housing 10 is a frame for supporting components. The guide shoe 12 is located in front of and under the slider 6.

The housing 10 includes a motor housing 18, a gear housing 20, a handle housing 21, and a cover 22. The motor housing 18 supports the components of the power mechanism 2 directly or indirectly. The gear housing 20 is connected to the front of the motor housing 18. The gear housing 20 supports the components of the reciprocating conversion mechanism 4, the slider 6, and the counterweight mechanism 8 directly or indirectly. The handle housing 21 is connected to the rear of the motor housing 18, and is in a loop shape. The cover 22 is externally mounted on the gear housing 20. The cover 22 may not be a component of the housing 10.

The motor housing 18 is in a cylindrical shape having openings in its front and rear ends, and communicates with the gear housing 20.

The motor housing 18 has multiple outlets 23 in its right and left side surfaces. The multiple outlets 23 are aligned vertically on each side surface. Each outlet 23 extends in the front-rear direction.

The gear housing 20 has a half-split structure, and is in a cylindrical shape having openings in its front and rear ends. The gear housing 20 accommodates the reciprocating conversion mechanism 4. The gear housing 20 is a conversion mechanism housing. The gear housing 20 includes a left gear housing 20a and a right gear housing 20b. The left gear housing 20a has multiple screw holes. One of the screws 24 is placed through the screw hole and received in the corresponding screw boss 25 in the right gear housing 20b, fastening the left gear housing 20a to the right gear housing 20b.

The left gear housing 20a includes a motor front housing 20c in its rear end portion. The motor front housing 20c is located between the motor housing 18 and the gear housing 20.

The motor front housing 20c is in a plate shape extending vertically and laterally. The motor front housing 20c protrudes rightward from another part (inner surface) of the left gear housing 20a. The motor housing 18 receives screws 26 (FIG. 7) in the four corners (upper left, lower left, upper right, and lower right) of the motor front housing 20c, fastening the left gear housing 20a to the front end of the motor housing 18.

The gear housing 20 accommodates, in its front upper portion, a lamp (light-emitting diode, or LED) 27 between the left gear housing 20a and the right gear housing 20b. The lamp 27 emits light forward.

The handle housing 21 has an opening in its front end, and communicates with the motor housing 18.

The handle housing 21 has a half-split structure, and includes a left handle housing 21a and a right handle housing 21b. The handle housing 21 includes a handle 30 in a rear portion of the loop. The handle 30 extends vertically.

The handle 30 includes a trigger 32 exposed on its front. The trigger 32 is connected to a main switch 34. The main switch 34 is located behind the trigger 32 inside the handle housing 21.

The main switch 34 is fastened to the handle housing 21 with multiple screws 34a. The main switch 34 is turned on when the retraction amount of the trigger 32 exceeds a predetermined amount, and transmits a signal (e.g., a resistance) that varies depending on the retraction amount.

Multiple screws 36 are placed through screw holes 21d and received in the corresponding screw bosses 37 in the left handle housing 21a, fastening the right handle housing 21b to the left handle housing 21a.

A cord 38 connected to utility power is connected to the lower rear of the handle housing 21. The end of the cord 38 is fastened with multiple screws 38a.

The handle housing 21 has multiple inlets 39a in the inner front surface of the loop. Each inlet 39a extends laterally. In each of the left handle housing 21a and the right handle housing 21b, the inlets 39a are arranged vertically.

The handle housing 21 has multiple inlets 39b in the right surface of its lower front portion. Each inlet 39b extends vertically along the lower front portion of the handle housing 21. The multiple inlets 39b are aligned in the front-rear direction.

The handle housing 21 has no inlet 39b in the left surface of the lower front portion to achieve sufficiently high strength of the screw bosses 37. The handle housing 21 may have the inlets 39b in at least one of the left side surface of its lower front portion and another portion of the handle housing 21.

The front end of the handle housing 21 covers the rear end of the motor housing 18.

The cover 22 is in a cylindrical shape. The rear end of the cover 22 covers a most part (excluding middle portions on the right, left, and bottom) of the motor front housing 20c and the front end of the motor housing 18, and is continuous with the motor housing 18.

The cover 22 includes a blade clamp cover 41 at its front end. The blade clamp cover 41 extends like a hood protruding frontward above the lamp 27. This structure prevents an operator's hand or other part from entering inside the cover 22 (inside the gear housing 20) or inside a movable area of the slider 6, or prevents an operator's hand from coming in contact with the lamp 27.

The power mechanism 2 includes an electric motor 42. The motor 42 includes a motor shaft 43 as a rotary drive shaft, which extends in the front-rear direction. The motor shaft 43 has a front portion protruding frontward, and a front end receiving teeth 43a on its periphery.

The motor 42 is electrically connected to the cord 38 and the trigger 32 with a lead wire (not shown) and terminals T1 to T3 located in the housing 10 (mainly in the handle housing 21) as shown in FIG. 3. One or more lead wires (or a bundle of lead wires) may be used.

The trigger 32 is pulled to turn on the main switch 34, and powers on the motor 42 through the cord 38 to drive the motor shaft 43. The rotational speed of the motor shaft 43 is changed in response to the signal from the main switch 34 corresponding to the retraction amount of the trigger 32, and increases as the retraction amount increases.

The motor shaft 43 has a centrifugal fan 44 located outward from the rear of its front uncovered portion. The fan 44 rotates and forces the air out. The fan 44 is fastened to the motor shaft 43. The outlets 23 are located outside the fan 44.

In front of the fan 44, a motor front bearing 46 is mounted on the motor shaft 43. The motor front bearing 46 supports the motor shaft 43 in a rotatable manner. The motor front bearing 46 is held in the middle portion of the motor front housing 20c. The motor front housing 20c is a bearing retainer supporting the motor front bearing 46.

The motor front housing 20c receives, at its rear, the fan case 48 fastened with screws 49 received in the upper and lower ends. The fan case 48 covers the top, bottom, front, and rear of the fan 44. The front surface of the fan case 48 covers the rear surface of the outer ring of the motor front bearing 46.

The reciprocating conversion mechanism 4 includes a gear 60 (first gear), a support shaft 64, a connecting rod 67, a pin 68, a left guide roller 69 (guide roller), a right guide roller 70 (guide roller), a left guide 72, and a right guide 73. The gear 60 is disk-shaped, includes a bevel gear 60a meshing with the teeth 43a on its outer edge, and has a hole in the center. The support shaft 64 extends through the center hole in the gear 60, and extends in the lateral direction. The connecting rod 67 is like an arm, and is connected to the gear 60 with a bearing 66 (needle bearing). The bearing 66 is externally mounted on a shaft 65. The shaft 65 is a column protruding rightward from a peripheral portion of the right side of the gear 60, and extends in the lateral direction. The pin 68 is connected to an end (front end) of the connecting rod 67 opposite to a connection part (rear end) of the connecting rod 67 with the shaft 65, and is located at the rear end of the slider 6. The left guide roller 69 is located at the left end of the pin 68. The right guide roller 70 is located at the right end of the pin 68. The left guide 72 is located outside on the left of the left guide roller 69. The right guide 73 is located outside on the right of the right guide roller 70.

At least any of the connecting rod 67, the bearing 66, the pin 68, the left guide roller 69, the right guide roller 70, the left guide 72, and the right guide 73 may not be a component of the reciprocating conversion mechanism 4, and may be a component of the output unit (slider 6).

The gear 60 extends in the front-rear and vertical directions, and is rotatable about the support shaft 64. The gear 60 has a larger diameter (more teeth) than the motor shaft 43, and thus reduces the rotation of the motor shaft 43.

The shaft 65 protrudes at a position decentered from the rotation center of the gear 60 (support shaft 64).

The pin 68 is columnar, and extends in the lateral direction. The pin 68 is placed through the front end of the connecting rod 67 in a relatively rotatable manner.

The left guide roller 69 is supported on the left end of the pin 68 in a rotatable manner and the right guide roller 70 is supported on the right end of the pin 68 in a rotatable manner. The left guide roller 69 and the right guide roller 70 are both formed from a sintered material. A sintered material has numerous pores, which adsorb lubricating oil included in grease (lubricant), and allow the lubricating oil to pass through them. Grease includes lubricating oil and a thickener.

The front end of the connecting rod 67 is received in the slider 6 through its rear end, and the pin 68 is received beyond the rear end of the slider 6. The pin 68 is placed in lateral holes in the slider 6, and is rotatable relative to the slider 6.

The pin 68 is prevented from slipping off the slider 6, and is movable back and forth together with the slider 6.

The connecting rod 67, the left guide roller 69, and the right guide roller 70 are rotatable relative to the pin 68. The pin 68 connects the connecting rod 67 and the slider 6, and serves as a shaft for the left guide roller 69 and the right guide roller 70.

The left guide 72 extends in the front-rear direction. The left guide 72 has a groove 72a, an upper side portion 72b, and a lower side portion 72c. The groove 72a recedes leftward, opens rightward, and extends in the front-rear direction in the middle portion of the left guide 72 in the vertical direction. The upper side portion 72b extends upward from the upper side of the groove 72a. The lower side portion 72c extends downward from the lower side of the groove 72a. The vertical dimension (width) of the groove 72a is substantially the same as (slightly larger than) the diameter of the left guide roller 69.

The right guide 73 and the left guide 72 are substantially symmetric to each other with respect to a plane. The right guide 73 includes a groove 73a that recedes rightward, opens leftward, and extends in the front-rear direction, an upper side portion 73b, and a lower side portion 73c.

The left guide 72 and the right guide 73 face each other. The lower side portions 72c and 73c of the left guide 72 and the right guide 73 are spaced from each other by substantially the same distance as the lateral dimension of the connecting rod 67.

The left guide 72 has boss holes in the front portion of the upper side portion 72b and the rear portion of the lower side portion 72c. The boss holes are diagonal to each other and receive the corresponding bosses 74 in the left gear housing 20a to position the left guide 72. The left guide 72 has screw holes in the rear portion of the upper side portion 72b and the front portion of the lower side portion 72c. The screw holes are diagonal to each other and receive screws 75 placed until in contact with the left gear housing 20a to fasten the left guide 72 to the left gear housing 20a.

The right guide 73 is positioned and fastened in the same manner as the left guide 72.

When the shaft 65 moves (revolves) as the gear 60 rotates, the displacement component of the shaft 65 in the front-rear direction is transmitted to the connecting rod 67.

The pin 68, the left guide roller 69, and the right guide roller 70 reciprocate in the front-rear direction with the connecting rod 67, while the left guide roller 69 and the right guide roller 70 are rolling in the grooves 72a and 73a and being guided by the left guide 72 and the right guide 73 (connecting rod type).

The left guide roller 69 rotates in the left guide 72, and the right guide roller 70 rotates in the right guide 73. Thus, the vertical displacement component caused by the revolution of the shaft 65 is not transmitted to the pin 68, the left guide roller 69, and the right guide roller 70.

The left guide roller 69 and the right guide roller 70 (and the left guide 72 and the right guide 73) may be eliminated, and the connecting rod 67 and the slider 6 may be connected to each other simply with the pin 68. In other embodiments, the left guide roller 69 (and the left guide 72) and the pin 68 may be provided, and the right guide roller 70 (and the right guide 73) may be eliminated, or the right guide roller 70 (and the right guide 73) and the pin 68 may be provided, and the left guide roller 69 (and the left guide 72) may be eliminated.

The slider 6 extends in the front-rear direction. The slider 6 includes a blade clamp 78 at its front end.

The blade clamp 78 is expanded vertically and laterally with respect to a slider base 79. The slider base 79 is a cylinder with a bottom, and is located behind the blade clamp 78. The blade clamp 78 includes a blade (not shown) with its edge facing downward.

The slider base 79 has a blind inner bore 79a (hollow). The inner bore 79a has the bottom in the front. The cross section (section extending vertically and laterally) of the slider base 79 is circular, and has no corners. The cross section of the slider base 79 may have an outer shape without corners, such as an oval, or an outer shape with corners, such as a rectangle and a polygon. The hollow in the slider base 79 may have a thicker bottom or may be defined by a cylinder without a bottom.

The slider base 79 opens rearward. The front end of the connecting rod 67 and the middle portion of the pin 68 are located inside the opening. The two ends of the pin 68, the left guide roller 69, and the right guide roller 70 are located outside the opening.

The inner bore 79a in the slider base 79 receives a felt piece 80. The felt piece 80 is a prism, and is a lubricant-impregnated member. The felt piece 80 has the same length in the longitudinal (front-rear) direction as the inner bore 79a, and more specifically the length obtained by subtracting the length of the front end of the connecting rod 67 received in the inner bore 79a from the length of the inner bore 79a. The felt piece 80 is impregnated with grease as a lubricant.

The felt piece 80 can be prepared easily by cutting a felt plate with a predetermined thickness corresponding to the thickness of the columnar felt piece 80 and a predetermined width corresponding to (a positive integer multiple of) the length of the felt piece 80.

The felt piece 80 may be prepared in any manner other than the above. The felt piece 80 may partially extend from the inner bore 79a. The lubricant-impregnated member may be other than the felt piece 80 and may be, for example, a sponge, and the lubricant may be other than grease and may be, for example, a silicone oil.

Outside the slider base 79, an upper slider support roller 82 and a lower slider support roller 83 are located in front portions of the left guide 72 and the right guide 73.

The upper slider support roller 82 extends in the lateral direction. The upper slider support roller 82 is a spool having a narrow part X1 across the circumference about the central axis extending in the lateral direction. The narrow part X1 can be in contact with the slider 6. The narrow part X1 is narrowed, and is deeper in the middle than in its right and left ends in the lateral direction. The narrow part X1 has an arc-shaped cross section (FIG. 8). The arc has substantially the same diameter as the slider base 79, and microscopically has a slightly larger diameter than the slider base 79. The upper slider support roller 82 has a lower surface of the narrow part X1 (narrowed portion) in contact with the upper surface of the slider base 79. The upper slider support roller 82 is supported in a manner rotatable about an upper slider support roller shaft 84 that is coaxial with its central axis.

The lower slider support roller 83 is the same as the upper slider support roller 82. The lower slider support roller 83 has a narrow part X2 (narrowed portion, or contact portion) having an upper surface in contact with the lower surface of the slider base 79. Similarly to the upper slider support roller 82, the lower slider support roller 83 is supported in a manner rotatable about a lower slider support roller shaft 85.

The upper slider support roller 82 and the lower slider support roller 83 may be replaced with right and left slider support rollers, or by a single slider support roller or three or more slider support rollers. The rollers may have a narrow part with a cross section partly conforming to a part of the cross section of the slider 6. Also, multiple different rollers may be used in combination.

As shown in FIG. 8, the upper slider support roller shaft 84 is supported on the left gear housing 20a at its left end with a left bearing 86 (oilless bearing) in a rotatable manner. The right surface of the left bearing 86 is in contact with the left surface of the upper slider support roller 82.

Similarly to the left end, the upper slider support roller shaft 84 is supported on the right gear housing 20b at its right end with a right bearing 86 (oilless bearing) in a rotatable manner. The left surface of the right bearing 86 is in contact with the right surface of the upper slider support roller 82.

The right and left bearings 86 thus support the upper slider support roller shaft 84 in a rotatable manner. The right and left bearings 86 serve as rotatable supports for the upper slider support roller shaft 84. The right and left bearings 86 restrict lateral movement of the upper slider support roller 82.

Similarly to the upper slider support roller shaft 84, right and left bearings 87 support the lower slider support roller shaft 85 in a rotatable manner. The right and left bearings 87 serve as rotatable supports for the lower slider support roller shaft 85. The right and left bearings 87 restrict lateral movement of the lower slider support roller 83.

The slider 6 is movable in the front-rear direction as guided by the upper slider support roller 82 and the lower slider support roller 83. When the slider 6 moves in the front-rear direction, the upper slider support roller 82 and the lower slider support roller 83 rotate about the upper slider support roller shaft 84 and the lower slider support roller shaft 85.

The pin 68 is connected to the slider base 79. The slider 6 is guided in the front-rear direction by the pin 68, the left guide roller 69, and the right guide roller 70, and reciprocates with the connecting rod 67 connected to the pin 68.

The blade extends through the guide shoe 12. The guide shoe 12 includes a shoe plate 90, a shoe supporter cover 91, a shoe supporter 92, and right and left pins 93. The shoe plate 90 can be in contact with a workpiece. The shoe supporter cover 91 is fixed to the gear housing 20. The shoe supporter 92 is located inside the shoe supporter cover 91. The pins 93 are located at the front end of the shoe supporter 92, and support the shoe plate 90 in a manner swingable about the axis extending in the lateral direction.

The shoe supporter 92 and the shoe supporter cover 91 each have a U-shaped cross section. The shoe supporter 92 and the shoe supporter cover 91 are located between the outer surface of the lower front portion of the gear housing 20 and the inner surface of the lower front portion of the cover 22. The shoe supporter cover 91 is fastened to the gear housing 20 with a bolt 94 extending in the lateral direction. The shoe supporter 92 is located inside the shoe supporter cover 91 in a manner slidable in the front-rear direction. The housing 10 may or may not include the shoe supporter cover 91.

A shoe lever 96 is located outside the shoe supporter cover 91. The shoe lever 96 includes a shoe supporter-fixing shaft (not shown) extending in the lateral direction above the shoe supporter cover 91 and the shoe supporter 92. The shoe lever 96 is rotatable about the shoe supporter-fixing shaft, and operable to be open and closed with respect to the shoe supporter cover 91. When the shoe lever 96 is closed (extends in the front-rear direction in the figures), the shoe supporter-fixing shaft fastens and fixes the shoe supporter 92. When the shoe lever 96 is open (extends in the vertical direction), the shoe supporter-fixing shaft releases the shoe supporter 92, allowing the shoe supporter 92 and the shoe plate 90 to slide in the front-rear direction to adjust their positions.

As shown in FIGS. 5 and 6, the counterweight mechanism 8 includes a metal balancer 100.

The balancer 100 has the shape of a part of a round plate extending in the front-rear and vertical directions. The balancer 100 includes a sector portion 100*a* and an arm portion 100*b*. The sector portion 100*a* has a central angle of about 100 degrees viewed from the left. The arm portion 100*b* extends in the radially opposite direction from the central angle portion of the sector portion 100*a*. The right end of the shaft 65 integral with the gear 60 is press-fitted into a hole in the end of the arm portion 100*b* opposite to the sector portion 100*a*, and thus the balancer 100 is connected to and cantilevered by the shaft 65. The central angle portion of the balancer 100 and the central portion of the gear 60 overlap each other as viewed from the left to the right, or specifically in a side view. The central angle portion of the balancer 100 has a hole 101 through which a tool (e.g., a driver) for attaching the support shaft 64 passes.

The balancer 100 is integral with the gear 60 (shaft 65). The balancer 100 rotates about the arm portion 100*b* as the gear 60 rotates (the shaft 65 revolves). When the slider 6 is located at a retracted position (the position shown in the figures), the shaft 65 is located at the rear, and the sector portion 100*a* is at the front. When the slider 6 is located at an advanced position, the shaft 65 is located at the front, and the sector portion 100*a* is at the rear. The weight and the center of gravity of the sector portion 100*a* (weight portion) are set to minimize vibrations of the slider 6, the blade, and the connecting rod 67. The balancer 100 (sector portion 100*a*) operates in the direction opposite to the reciprocation of the slider 6 and other components, and thus serves as a counterweight.

On the outer surface (upper right portion) of the motor housing 18, a hook 110 is attached with a hook attachment 112.

The hook 110 is a wire bent into a U shape as viewed laterally.

The hook attachment 112 has a cylindrical hole extending in the front-rear direction and multiple (front and rear) screw holes. The cylindrical hole receives one end of the hook 110 extending in the front-rear direction to allow the hook 110 to be pivotable on the end. Screws 114 are received through the screw holes into the motor housing 18 to fasten the hook attachment 112 to the motor housing 18.

The gear housing 20 is sealed with an upper sealant 120, a lower sealant 122, the motor front housing 20*c*, and a seal member 124.

The upper sealant 120 is a linear elastic member with a substantially circular cross section. The upper sealant 120 is received in a groove extending in the front-rear direction in an upper thick part of the left gear housing 20*a* corresponding to the right gear housing 20*b* and thus provided in the left gear housing 20*a*. The upper sealant 120 has a rear end 120*a* bent downward and received in a groove on the upper end of the middle portion of the motor front housing 20*c*. The upper sealant 120 has a front end 120*b* reaching above and in front of the upper slider support roller 82 and bent downward.

The lower sealant 122 is an elastic member similar to the upper sealant 120. The lower sealant 122 is provided in a lower thick part of the left gear housing 20*a* corresponding to the right gear housing 20*b* in the same manner as the upper sealant 120. The lower sealant 122 has a rear end 122*a* bent upward to enter a groove on the lower end of the middle portion of the motor front housing 20*c*. The lower sealant 122 has a front end 122*b* reaching under and in front of the lower slider support roller 83 and bent upward.

The seal member 124 includes a base 130, an outer ring 132, an inner ring 134, an inner front ring 136, and a washer 138. The base 130 is cylindrical, and has an axis extending in the front-rear direction. The outer ring 132 is a second elastic member, and is located outside the base 130. The inner ring 134 is a first elastic member, and is located inside the base 130.

The base 130 includes a rear flange and a front flange. The rear flange extends radially inward and outward at the rear end of the base 130. The front flange extends radially outward at the front end of the base 130.

The slider base 79 extends through the base 130. The base 130 is not in contact with the slider 6.

The inner diameter of the rear flange is slightly larger than the outer diameter of the slider base 79.

The base 130 may not be cylindrical, and may be, for example, prismatic. At least the front flange or the rear flange may be eliminated.

The outer ring 132 is a ring-shaped elastic member (rubber), and is located between the front flange and rear flange on the base 130.

The outer ring 132 has a groove continuous along the middle of the outer surface in the front-rear direction. The upper portion of the groove receives the front end 120*b* of the upper sealant 120. The lower portion of the groove receives the front end 122*b* of the lower sealant 122.

The outer ring 132 may not be ring-shaped, may not have the groove (recess) continuous along the outer ring 132 but have grooves receding in its upper and lower ends (portions adjacent to the sealants), and may have no groove.

The inner ring 134 is a ring-shaped elastic member (rubber), and is located in front of the rear flange on the base 130. The inner ring 134 has an X-shaped cross section (X-ring) having recesses on its outer and inner surfaces. The inner ring 134 has a groove continuous along the outer surface and a groove continuous along the inner surface.

The inner ring 134 is in contact with the outer surface of the slider base 79 on both sides of the inner groove. The groove reduces an area of contact of the inner ring 134 with the slider base 79 and reduces friction during reciprocation of the slider base 79, while increasing tightness on the outer surface of the groove for effective sealing.

The inner ring 134 may have a groove only on its inner surface, or may have a groove on its front or rear end. The inner ring 134 may not be ring-shaped, and may have a cross section other than the X-shaped cross section, without having for example, at least the outer groove or the inner groove. The inner ring 134 may be integral with the outer ring 132.

The inner front ring 136 is a ring-shaped elastic member (felt piece). The inner front ring 136 is located in front of the inner ring 134, and is in contact with the outer surface of the slider base 79 on its inner surface. The inner front ring 136 may not be ring-shaped, or may also be eliminated.

In front of the inner front ring 136, the ring-shaped washer 138 with a lip serves as a lid and is fitted in the front portion of the cylindrical hole in the base 130. The inner ring 134 and the inner front ring 136 are placed between the washer 138 and the rear flange on the base 130. The washer 138 is not in contact with the slider 6.

The seal member 124 is placed between the left gear housing 20a and the right gear housing 20b and is thus attached in the front end portion of the gear housing 20. The radially outer surface and a part of the front surface of the rear flange on the base 130 and the radially outer surface of the front flange on the base 130 are in contact with the gear housing 20. The outer sides (front and rear sides) of the outer groove on the outer ring 132 are in contact with the gear housing 20.

The seal member 124 may be at any position other than in front of the rollers.

The gear housing 20, which is sealed with the upper sealant 120, the lower sealant 122, the motor front housing 20c, and the seal member 124, contains a predetermined amount of grease (e.g., an enough amount to cover the inner wall of the gear housing 20 and the outer walls of internal components of the gear housing 20).

Lubricating oil in the grease lubricates the components in the gear housing 20. The lubricating oil in the grease lubricates the sliding portions such as the pin 68, the left guide roller 69, and the right guide roller 70. Unless externally replenished with lubricating oil, the lubricating oil decreases and is finally used up by the sliding portions (causing oil film breakdown or lubricant breakdown). The slide portions may be unlubricated due to oil film breakdown, and may have failures in sliding. Either heat generation or seizure or both may cause failures in at least the slide portions or in portions adjacent to the slide portions.

Without the felt piece 80, the grease is less likely to pass through the pin 68, the left guide roller 69, and the right guide roller 70 surrounded by the left guide 72, the right guide 73, and the rear end opening in the slider base 79. Thus, when the reciprocating saw 1 continues to operate for a predetermined duration or longer, the pin 68, the left guide roller 69, and the right guide roller 70 may be insufficiently replenished with grease, and may cause oil film breakdown. More specifically, oil film breakdown may occur on the left guide roller 69 and the left end of the pin 68 between the left guide 72 and the outer left surface of the slider base 79. Oil film breakdown may also occur on the right guide roller 70 and the right end of the pin 68 between the right guide 73 and the outer right surface of the slider base 79. Additionally, oil film breakdown may occur on the front end of the connecting rod 67 and the middle portion of the pin 68 inside the rear end opening in the slider base 79.

In contrast, the reciprocating saw 1 according to the present embodiment includes the felt piece 80 impregnated with grease, which replenishes the pin 68, the left guide roller 69, and the right guide roller 70 with grease, and thus prevents oil film breakdown. More specifically, the felt piece 80 is adjacent to the rear end opening of the slider base 79, and supplies grease to the front end of the connecting rod 67 and the middle portion of the pin 68 in the opening. The felt piece 80 also supplies grease to the left ends of the left guide roller 69 and the pin 68 and the right ends of the right guide roller 70 and the pin 68 adjacent to the opening.

The felt piece 80, which holds a predetermined maximum impregnation amount of grease or less, gradually releases the grease under the act of, for example, an inertial (centrifugal) force resulting from reciprocation. When the felt piece 80 holding an amount of grease less than the predetermined maximum impregnation amount receives external grease, the felt piece 80 absorbs and holds the grease (reabsorption of grease). A small amount of grease passes through the pin 68, the left guide roller 69, and the right guide roller 70 and enters the slider base 79, and the felt piece 80 absorbs the grease in the slider base 79.

The slider base 79 with the felt piece 80 holds more grease over a longer time than the slider base 79 without the felt piece 80.

An example operation of the reciprocating saw 1 according to the present embodiment will now be described.

An operator attaches the blade on the stopped slider 6 with the edge (saw teeth) facing downward, and places the shoe plate 90 in the guide shoe 12 to have the front surface in contact with a workpiece. The operator holds the handle 30 and pulls the trigger 32 by a predetermined amount with the cord 38 connected to a power source. This turns on the main switch 34 to power the motor 42 and rotate the motor shaft 43. The motor shaft 43 rotates at a rotational speed in response to a signal (the retraction amount of the trigger 32) from the main switch 34.

As the motor shaft 43 rotates, the gear 60 rotates, and the slider 6 reciprocates with the connecting rod 67. The sector portion 100a of the balancer 100 moves in the direction opposite to the slider 6 in the front-rear direction, and the slider 6 reciprocates with reduced vibrations.

The slider 6 is guided by the left guide roller 69 in the left guide 72, the right guide roller 70 in the right guide 73, the upper slider support roller 82, and the lower slider support roller 83 while being prevented from facing in a direction other than the front-rear direction, or specifically, from moving (including changing the attitude) in a direction other than the reciprocating direction. The upper slider support roller 82 and the lower slider support roller 83 come in contact with the rear portion of the slider 6 located on the front end within the reciprocating range in the front-rear direction.

The slider 6 (slider base 79) has a circular cross section without corners. The upper slider support roller 82 and the lower slider support roller 83 are narrowed, and have the narrow parts X1 and X2. The slider 6 is in contact with the upper slider support roller 82 or the lower slider support roller 83 without corners, thus preventing the slider 6 from moving in an unintended direction without interrupting the reciprocation of the slider 6. The upper slider support roller 82 rotates about the upper slider support roller shaft 84, and the lower slider support roller 83 rotates about the lower slider support roller shaft 85. The slider 6 is thus smoothly guided to reciprocate, replacing the lubricant and preventing seizure.

The narrow parts X1 and X2 are narrowed. The narrow parts X1 and X2 can support a load from the slider 6, in particular, a lateral load. The slider 6 is naturally guided to the deepest (middle) portion of the narrowed portion. Microscopically, the narrow parts X1 and X2 are completely in contact with the slider 6 (slider base 79) along a short line in the front-rear direction or at one point and receive most of the load, and then the upper slider support roller 82 and the lower slider support roller 83 rotate. This reduces the influence of wear and frictional heat, and prevents wear and heat generation between the upper slider support roller 82 and the slider 6, and the lower slider support roller 83 and the slider 6, improving their durability.

The upper slider support roller shaft 84 is supported on the gear housing 20 with the right and left bearings 86 in a rotatable manner. This structure allows the upper slider support roller 82 to remain rotating together with the upper slider support roller shaft 84 when the upper slider support roller 82 is non-rotatable about the upper slider support roller shaft 84 due to, for example, an unintended lock, and maintains the guiding capability (attitude-maintaining capability) for the slider 6. This structure also prevents seizure in the upper slider support roller 82, the upper slider support roller shaft 84, and the slider 6 and improves the durability of the reciprocating saw 1.

Similarly to the upper slider support roller shaft 84, the lower slider support roller shaft 85 is supported with the right and left bearings 87. This structure allows the lower slider support roller shaft 85 to remain rotating with the lower slider support roller 83 when the lower slider support roller 83 is non-rotatable about the lower slider support roller shaft 85, and maintains the guiding capability for the slider 6. This structure also prevents seizure in the lower slider support roller 83, the lower slider support roller shaft 85, and the slider 6.

When the slider 6 reciprocates in the front-rear direction to the foremost position, the upper slider support roller 82 and the lower slider support roller 83 come in contact with the rear portion of the slider 6, and support the load of the rear portion of the slider 6. When the slider 6 is at the rearmost position, the upper slider support roller 82 and the lower slider support roller 83 come in contact with the front portion of the slider 6, and support the load of the front portion of the slider 6.

The gear housing 20 is sealed with the seal member 124, the upper sealant 120, the lower sealant 122, and the motor front housing 20c.

The seal member 124 is separate from the gear housing 20. This structure allows easier assembly than the structure including a sealant integral with the gear housing 20, and allows effective sealing between the slider 6 and the gear housing 20 although the upper slider support roller 82 and the lower slider support roller 83 serve as attitude-maintaining units for the slider 6. The upper slider support roller 82 and the lower slider support roller 83, which serve as attitude-maintaining units for the slider 6, are separate from the seal member 124. This structure allows sealing with less consideration to attitude-maintaining operations than the structure including attitude-maintaining units integral with a sealant. This improves the sealing performance, facilitates repair, and allows independent replacement of each component.

The outer ring 132 has the groove (recess) to receive parts (front ends 120b and 122b) of the upper sealant 120 and of the lower sealant 122, which are other sealants. When the parts of the upper sealant 120 and the lower sealant 122 are placed in tight contact with the groove, the outer ring 132 deforms and covers the parts of the upper sealant 120 and the lower sealant 122, greatly improving their tightness.

The seal member 124 is in contact with the slider 6 at the inner ring 134 (first elastic member) and with the gear housing 20 at the outer ring 132 (second elastic member). Thus, the seal member 124 closely follows the slider 6, and easily absorbs vibrations of the slider 6.

As the motor shaft 43 rotates, the fan 44 rotates, and air flows from the fan 44 toward the outlets 23. This allows air to flow into the fan 44 through, for example, the inlets 39a and 39b in the handle housing 21, the handle housing 21, a space between the inner wall of the motor housing 18 and the motor 42, and a space (between a stator and a rotor) in the motor 42. The air cools the members supported in the housing 10 (particularly, the motor 42 and the terminal T1).

The handle housing 21 has the inlets 39b in addition to the inlets 39a, and thus obtains a larger volume (inflow) of air.

As the operator lowers the handle 30 with the slider 6 or the blade operating, the saw teeth on the reciprocating blade come in contact with a workpiece, and cut the workpiece vertically.

When the operator turns off the main switch 34 by operating the trigger 32, the motor shaft 43 stops, and each component stops reciprocating.

As the slider 6 reciprocates during the cutting operation, the felt piece 80 gradually releases the grease, which is supplied to the components such as the pin 68, the left guide roller 69, and the right guide roller 70.

When the felt piece 80 receives external grease, the felt piece 80 absorbs the grease for subsequent replenishment of the grease to be released.

The reciprocating saw 1 according to the present embodiment includes the motor 42, the reciprocating conversion mechanism 4 that converts the rotation of the motor 42 to reciprocation, the slider 6 connected to the reciprocating conversion mechanism 4 for reciprocation and having the inner bore 79a, and the felt piece 80 located in the inner bore 79a and impregnatable with grease. This structure easily supplies grease to the reciprocating conversion mechanism 4 to prevent a lack of grease, thus preventing at least malfunctioning or failure.

The reciprocating conversion mechanism 4 includes the gear 60 and the connecting rod 67 connected to the gear 60. The connecting rod 67 is connected to the slider 6 with the pin 68. This structure easily supplies grease to the pin 68 to prevent a lack of grease, thus preventing at least malfunctioning or failure.

The pin 68 supports the left guide roller 69 and the right guide roller 70 in a rotatable manner. This structure easily supplies grease to the left guide roller 69 and the right guide roller 70 to prevent a lack of grease, thus preventing at least malfunctioning or failure.

The left guide roller 69 and the right guide roller 70 are formed from a sintered material. The grease thus easily remains on the left guide roller 69 and the right guide roller 70, thus more easily lubricating the left guide roller 69 and the right guide roller 70.

The felt piece 80 has the same length as the inner bore 79a. This structure maximizes the size of the felt piece 80, and thus maximizes the amount of impregnating grease, supplying more grease over a longer period.

The felt piece 80 is used as a lubricant-impregnated member. The felt piece 80 is impregnated with a sufficient amount of grease, and thus releases an appropriate amount of grease without being excessive or insufficient for operation, and easily reabsorbs grease. The felt piece 80 has a certain level of rigidity (resilience), and is thus easily placed in the inner bore 79a in assembling the reciprocating saw 1.

The first embodiment and its modifications are not limited to those described above, and may be modified as appropriate as described below.

The cover may have a half-split structure and may include a right cover and a left cover.

The counterweight mechanism 8 may be modified variously. For example, the counterweight mechanism 8 may include the balancers 100 on both the right and left of the gear 60, or may be eliminated.

Some of the components may be eliminated, or the number of components, their materials, shapes, types, and arrangement may be modified variously. For example, the arrangement, the number, and the connection of the lead wire or the terminals T1 to T3 may be changed. The needle bearings may be replaced with ball bearings, or at least the number of sections in the housing 10 or the shape of each component may be changed.

The blade may have an edge other than the sawtooth edge.

In place of the cord 38, a battery may be used to supply power. In this case, the battery may be attachable to a battery mount included in, for example, the handle housing 21.

The first embodiment and its modifications are applicable to reciprocating cutting tools other than the reciprocating saw 1 (e.g., a jigsaw) and reciprocating tools other than reciprocating cutting tools.

Second Embodiment

Figure 9:
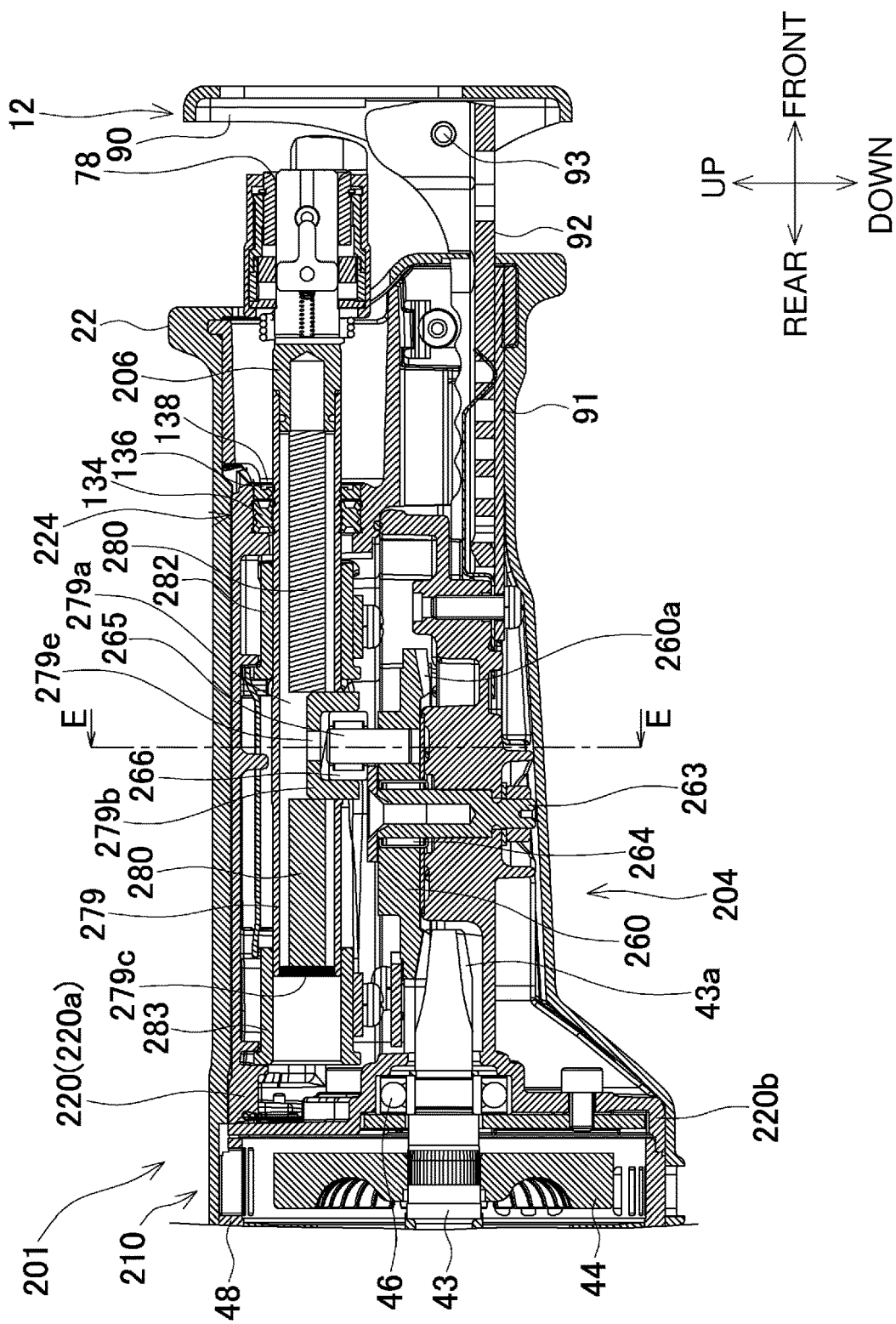
FIG. 9 is a view of a reciprocating saw according to a second embodiment corresponding to FIG. 4.
Figure 10:
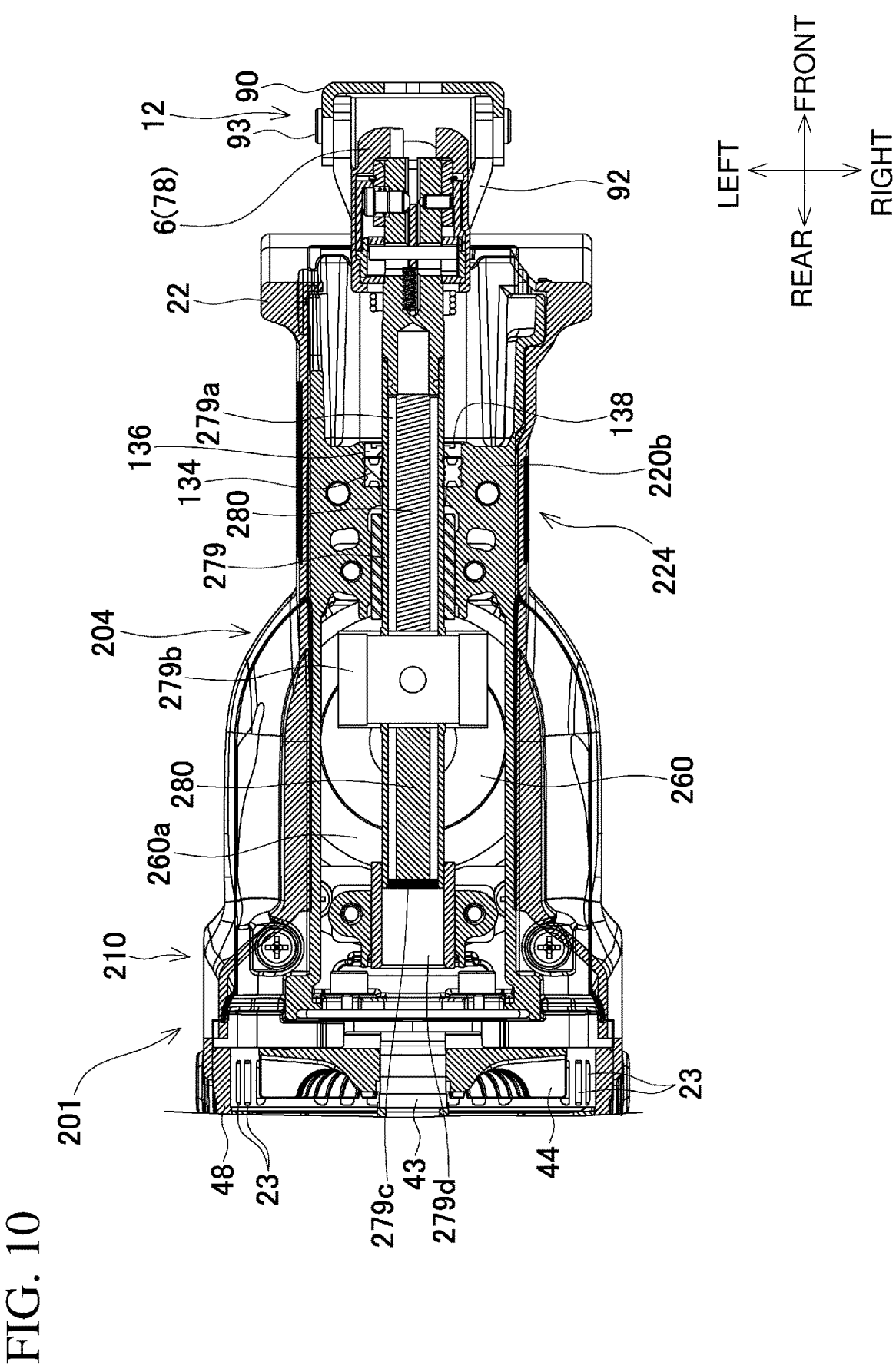
FIG. 10 is a view of the reciprocating saw according to the second embodiment corresponding to FIG. 5.
Figure 11:
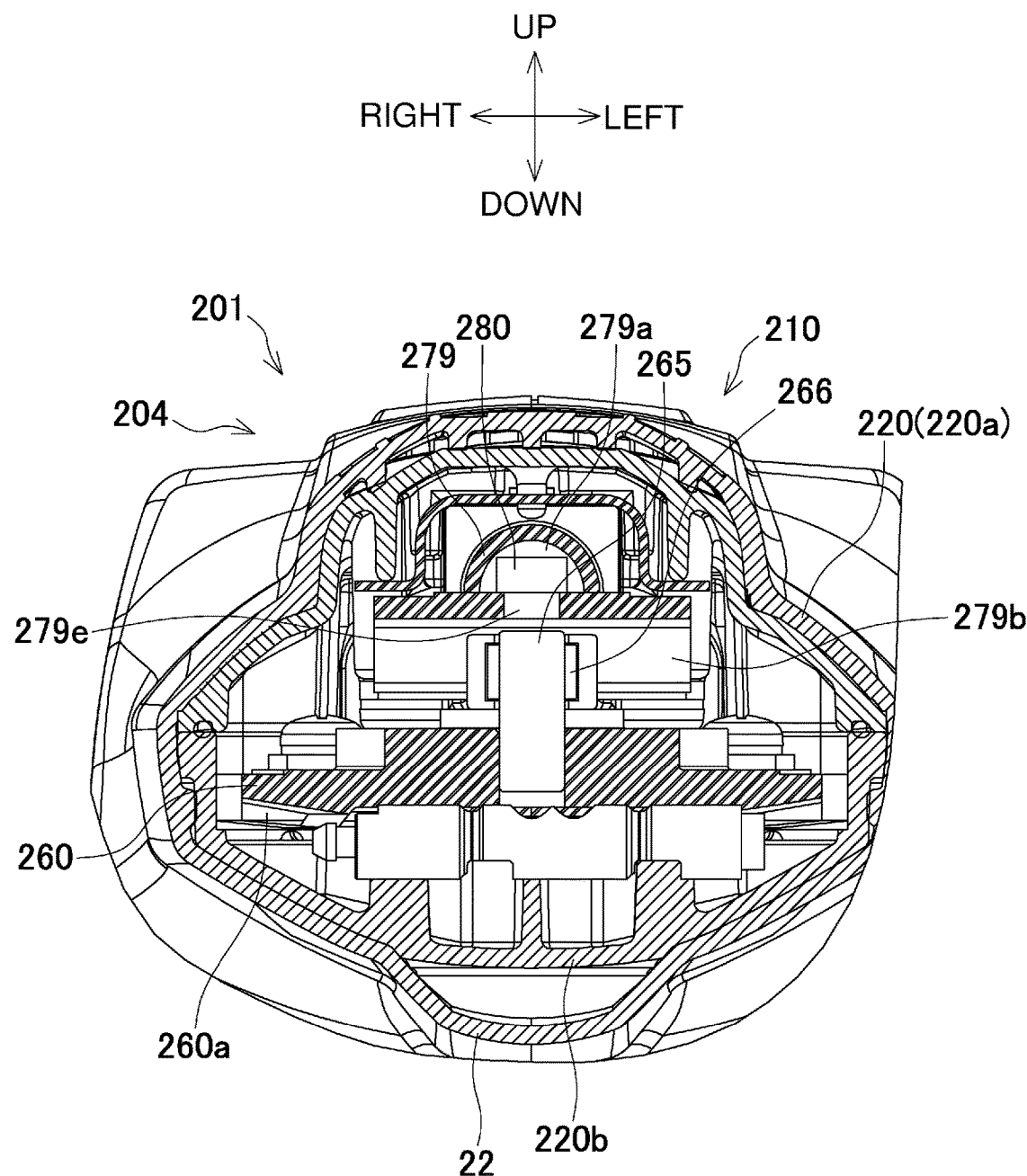
FIG. 11 is a cross-sectional view taken along line E-E in FIG. 9.

FIG. 9 is a view of a reciprocating saw 201 according to a second embodiment corresponding to FIG. 4. FIG. 10 is a view of the reciprocating saw 201 according to the second embodiment corresponding to FIG. 5. FIG. 11 is a cross-sectional view taken along line E-E in FIG. 9.

The reciprocating saw 201 according to the second embodiment differs from the reciprocating saw in the first embodiment in a reciprocating conversion mechanism and a slider. The components and portions that are the same as those in the first embodiment are given the same reference numerals, and will not be described.

The reciprocating saw 201 according to the second embodiment does not include the lamp 27 and the blade clamp cover 41. A gear housing 220 has a half-split structure, and includes an upper gear housing 220a and a lower gear housing 220b.

A reciprocating conversion mechanism 204 according to the second embodiment includes a gear 260 (second gear), a support shaft 263, a bearing 264, an eccentric shaft 265, and a bearing 266. The gear 260 receives, on its outer edge, a bevel gear 260a meshing with the teeth 43a on the distal end of the motor shaft 43. The gear 260 is flat and disk-shaped, and has a hole in the center. The support shaft 263 extends vertically and through the center hole in the gear 260. The bearing 264 is placed between the center hole in the gear 260 and the support shaft 263. The eccentric shaft 265 is a column integral with the gear 260, and protrudes upward from a peripheral portion of the upper surface of the gear 260. The bearing 266 is mounted externally on the upper end of the eccentric shaft 265.

The gear 260 may extend vertically and laterally.

A slider 206 according to the second embodiment includes a slider base 279 including an inner bore 279a and a connecting member 279b. The inner bore 279a is the same as the inner bore 79a. The connecting member 279b opens downward in the lower middle of the slider base 279 to receive the bearing 266.

The connecting member 279b has a U-shaped cross section, and extends laterally.

The inner bore 279a has a rear end opening, which is closed by a lid 279c.

As the motor shaft 43 rotates, the gear 260 rotates about the support shaft 263 extending vertically, thus revolving the eccentric shaft 265 decentered from the rotation center of the gear 260. The revolving eccentric shaft 265 has lateral movement that causes the connecting member 279b to reciprocate, without affecting the movement of the slider 206. The revolving eccentric shaft 265 has movement in the front-rear direction directly causing the connecting member 279b to move the slider 206 back and forth (lateral crank type).

The front portion of the slider base 279 does not include the base 130 and the outer ring 132 used in the first embodiment, and is sealed by a sealing portion 224 including the inner ring 134, the inner front ring 136, and the washer 138 held on a cylindrical portion of the upper gear housing 220a. The front portion of the slider base 279 is supported in a manner movable back and forth by a front support cylinder 282 (slider guide or lubricant-passage member) formed from a sintered material and serving as an oilless bearing replacing the upper slider support roller 82 and the lower slider support roller 83 used in the first embodiment. The rear end of the slider base 279 is received in a rear support cylinder 283 (slider guide or lubricant-passage member) formed from a sintered material and serving as an oilless bearing, and is supported by the rear support cylinder 283 within the reciprocating range of the slider 206 from the foremost position (shown in FIGS. 9 to 11) to the rearmost position. The front support cylinder 282 and the rear support cylinder 283 are held by the upper gear housing 220a.

The inner bore 279a in the slider 206 receives two felt pieces 280. Each felt piece 280 is the same as the felt piece 80. The two felt pieces 280 are arranged in front of and behind the connecting member 279b. The connecting member 279b has a communication hole 279e in the upper middle. The inner bore 279a communicates with the connecting member 279b, and the adjacent eccentric shaft 265 and the bearing 266 through the communication hole 279e.

Lubricating oil in grease impregnating the felt pieces 280 is gradually released through the communication hole 279e during operation to lubricate the inner surface of the connecting member 279b, the bearing 266 in contact with the inner surface of the connecting member 279b, and the eccentric shaft 265 radially internal to the bearing 266. Grease inside the gear housing 220 can enter the inner bore 279a through the communication hole 279e. The grease entering the inner bore 279a is reabsorbed by the two felt pieces 280.

The reciprocating saw 201 according to the present embodiment includes the motor 42, the reciprocating conversion mechanism 204 that converts the rotation of the motor 42 to reciprocation, the slider 206 connected to the reciprocating conversion mechanism 204 for reciprocation and having the inner bore 279a, and the felt pieces 280 located in the inner bore 279a and impregnatable with grease. This structure easily supplies grease to the reciprocating conversion mechanism 204 to prevent a lack of grease, thus preventing at least malfunctioning or failure.

The reciprocating conversion mechanism 204 includes the gear 260 including the eccentric shaft 265 connected to the slider 206. In the reciprocating conversion mechanism 204 in which the eccentric shaft 265 directly drives the slider 206, the driving components including the eccentric shaft 265 and adjacent components are lubricated sufficiently.

The total length of the two felt pieces 280 is the same as the length of the inner bore 279a. This structure maximizes the size of each felt piece 280, and thus maximizes the amount of impregnating grease, supplying more grease over a longer period.

The felt pieces 280 are used as lubricant-impregnated members. The felt pieces 280 are impregnated with a sufficient amount of grease, and thus release an appropriate amount of grease without being excessive or insufficient for operation, and easily reabsorb grease. The felt pieces 280 have a certain level of rigidity (resilience), and are thus easily placed in the inner bore 279a in assembling the reciprocating saw 201.

The second embodiment and its modifications may be modified as appropriate in the same manner as the first embodiment.

A single felt piece 280 or three or more felt pieces 280 may be used.

Third Embodiment

Figure 12:
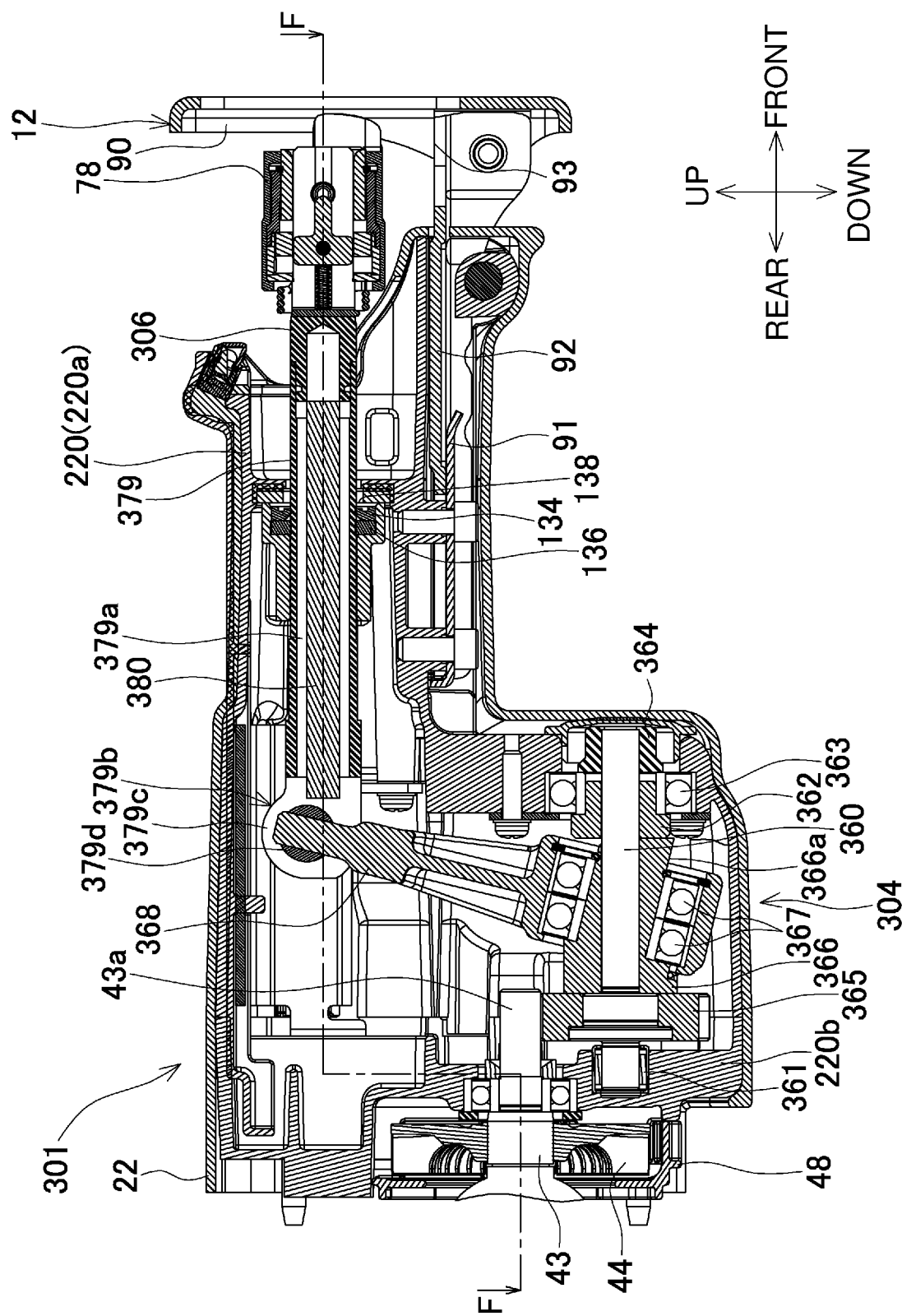
FIG. 12 is a view of a reciprocating saw according to a third embodiment corresponding to FIG. 4.
Figure 13:
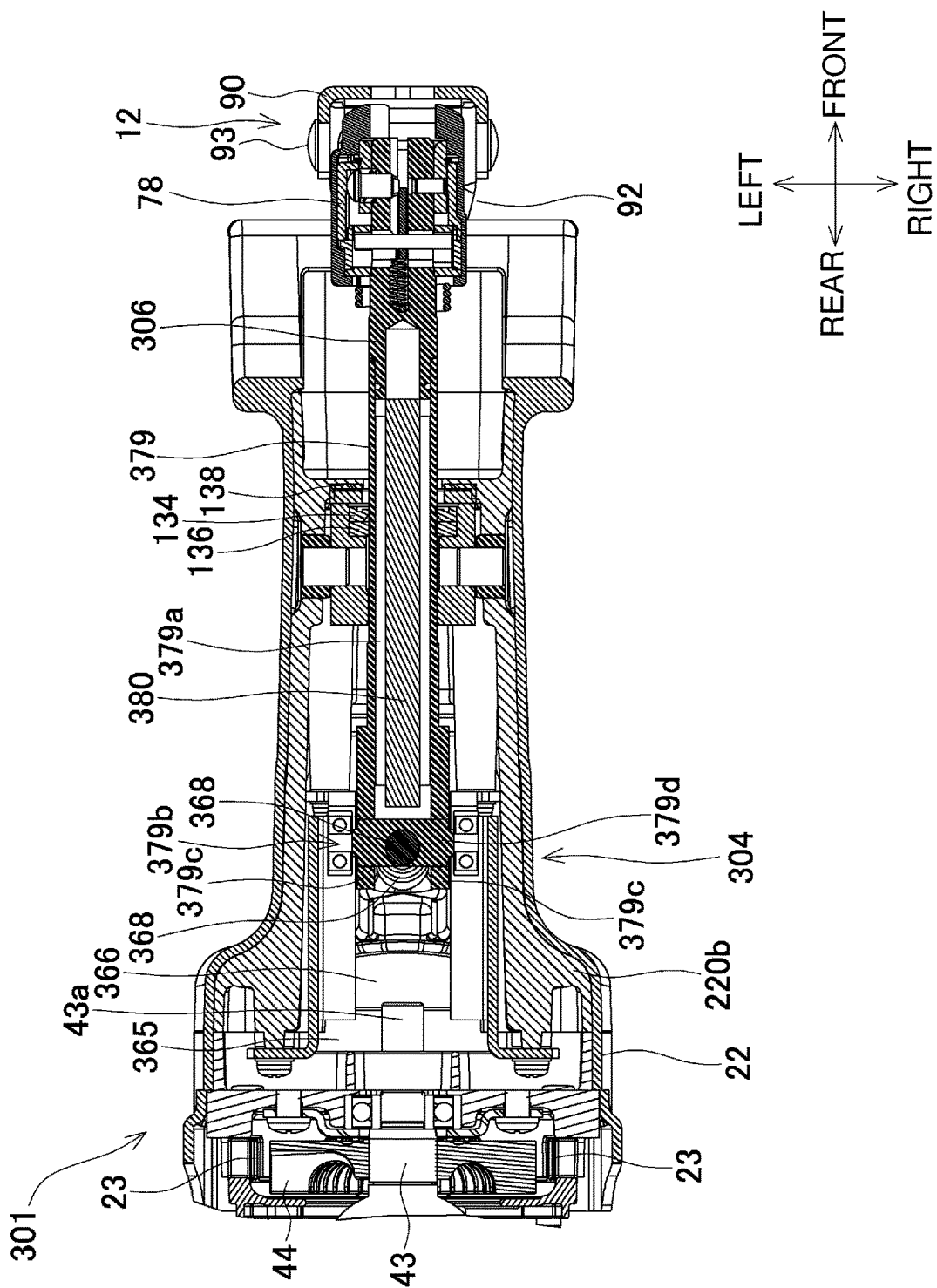
FIG. 13 is a cross-sectional view taken along line F-F in FIG. 12.

FIG. 12 is a view of a reciprocating saw 301 according to a third embodiment corresponding to FIG. 4. FIG. 13 is a cross-sectional view taken along line F-F in FIG. 12.

The reciprocating saw 301 according to the third embodiment differs from the reciprocating saw in the second embodiment in a reciprocating conversion mechanism and a slider. The components and portions that are the same as those in the second embodiment are given the same reference numerals, and will not be described.

A reciprocating conversion mechanism 304 according to the third embodiment includes a countershaft 360, a rear bearing 361 (needle bearing), a front bearing 363 (ball bearing), a cap 364, a gear 365, a boss sleeve 366, and an arm 368. The countershaft 360 is a column located below the distal end of the motor shaft 43, and extends in the front-rear direction. The rear bearing 361 supports the rear end of the countershaft 360 in a rotatable manner. The front bearing 363 supports the front end of the countershaft 360 with a bush 362 in a rotatable manner. The bush 362 is a stepped cylinder. The cap 364 is fastened externally to the front end of the countershaft 360 to prevent the countershaft 360 from slipping off, and to support the front bearing 363. The gear 365 is fastened externally to the rear portion of the countershaft 360 to mesh with the teeth 43a on the distal end of the motor shaft 43. The boss sleeve 366 is fastened in the middle of the countershaft 360. The boss sleeve 366 includes a sloping cylinder surface 366a sloping with respect to the central axis of the countershaft 360. The arm 368 is located outside the sloping cylinder surface 366a with two swash bearings 367 and faces upward.

The rear bearing 361 and the front bearing 363 are held by the lower gear housing 220b.

A slider base 379 according to the third embodiment includes an inner bore 379a and a connecting member 379b. The inner bore 379a is the same as the inner bore 279a. The connecting member 379b is connected to the arm 368 on the rear end of the slider base 379.

The connecting member 379b includes a pair of tab pieces 379c, holes, and a connecting pin 379d. The pair of tab pieces 379c are located on the right and left of the rear end of the slider base 379 and protrude rearward from the rear end. The holes are in the tab pieces 379c and extend in the lateral direction. The connecting pin 379d extends laterally, and has ends each received in the corresponding hole. The connecting pin 379d is rotatable relative to the holes in the tab pieces 379c. The connecting pin 379d is fastened to the upper end of the arm 368.

As the motor shaft 43 rotates, the gear 365, the countershaft 360, and the boss sleeve 366 rotate in an integral manner about the central axis of the countershaft 360. The rotation of the boss sleeve 366 is converted to swinging of the arm 368 in the front-rear direction through the swash bearings 367 on the sloping cylinder surface 366a (swash type).

In FIGS. 12 and 13, the upper end of the arm 368 and a slider 306 are at the foremost position.

The inner bore 379a receives a felt piece 380, which is the same as the felt piece 80. The felt piece 380 has the same length in the front-rear direction as the inner bore 379a.

Lubricating oil in grease impregnating the felt piece 380 is gradually released during operation to lubricate the upper end of the arm 368, the connecting pin 379d, and the holes in the tab pieces 379c on the rear end of the slider base 379. Grease in the gear housing 220 can enter the inner bore 379a through the rear end of the slider base 379 (through a gap between the inner wall of the rear end and the upper end of the arm 368 as well as the connecting pin 379d). The grease entering the inner bore 379a is reabsorbed by the felt piece 380.

The reciprocating saw 301 according to the present embodiment includes the motor 42, the reciprocating conversion mechanism 304 that converts the rotation of the motor 42 to reciprocation, the slider 306 connected to the reciprocating conversion mechanism 304 for reciprocation and having the inner bore 379a, and the felt piece 380 located in the inner bore 379a and impregnatable with grease. This structure easily supplies grease to the reciprocating conversion mechanism 304 to prevent a lack of grease, thus preventing at least malfunctioning or failure.

The reciprocating conversion mechanism 304 includes the boss sleeve 366 with the sloping cylinder surface 366a sloping with respect to the central axis, and the arm 368 located outside the sloping cylinder surface 366a. The arm 368 is connected to the slider 306. In the reciprocating conversion mechanism 304 in which the arm 368 swings with the boss sleeve 366 to move the slider 306 back and forth, the driving components including the upper end of the arm 368, the connecting pin 379d, the holes in the tab pieces 379c, and adjacent components are lubricated sufficiently.

The felt piece 380 has the same length as the inner bore 379a. This structure maximizes the size of the felt piece 380, and thus maximizes the amount of impregnating grease, supplying more grease over a longer period.

The felt piece 380 is used as a lubricant-impregnated member. The felt piece 380 is impregnated with a sufficient amount of grease, and thus releases an appropriate amount of grease without being excessive or insufficient for operation, and easily reabsorbs grease. The felt piece 380 has a certain level of rigidity (resilience), and is thus easily placed in the inner bore 379a in assembling the reciprocating saw 301.

The third embodiment and its modifications may be modified in the same manner as the first and second embodiments as appropriate.

In some embodiments, the cap 364 may be eliminated, or the countershaft 360 and at least the gear 365 or the boss sleeve 366 may be formed in an integral manner. A single swash bearing 367 or three or more swash bearings 367 may be used. The connecting member 379b may include a single tab piece 379c or three or more tab pieces 379c, or may eliminate the connecting pin 379d and use the holes in the tab pieces 379c to receive right and left projections integral with the upper end of the arm 368.

Fourth Embodiment

Figure 14:
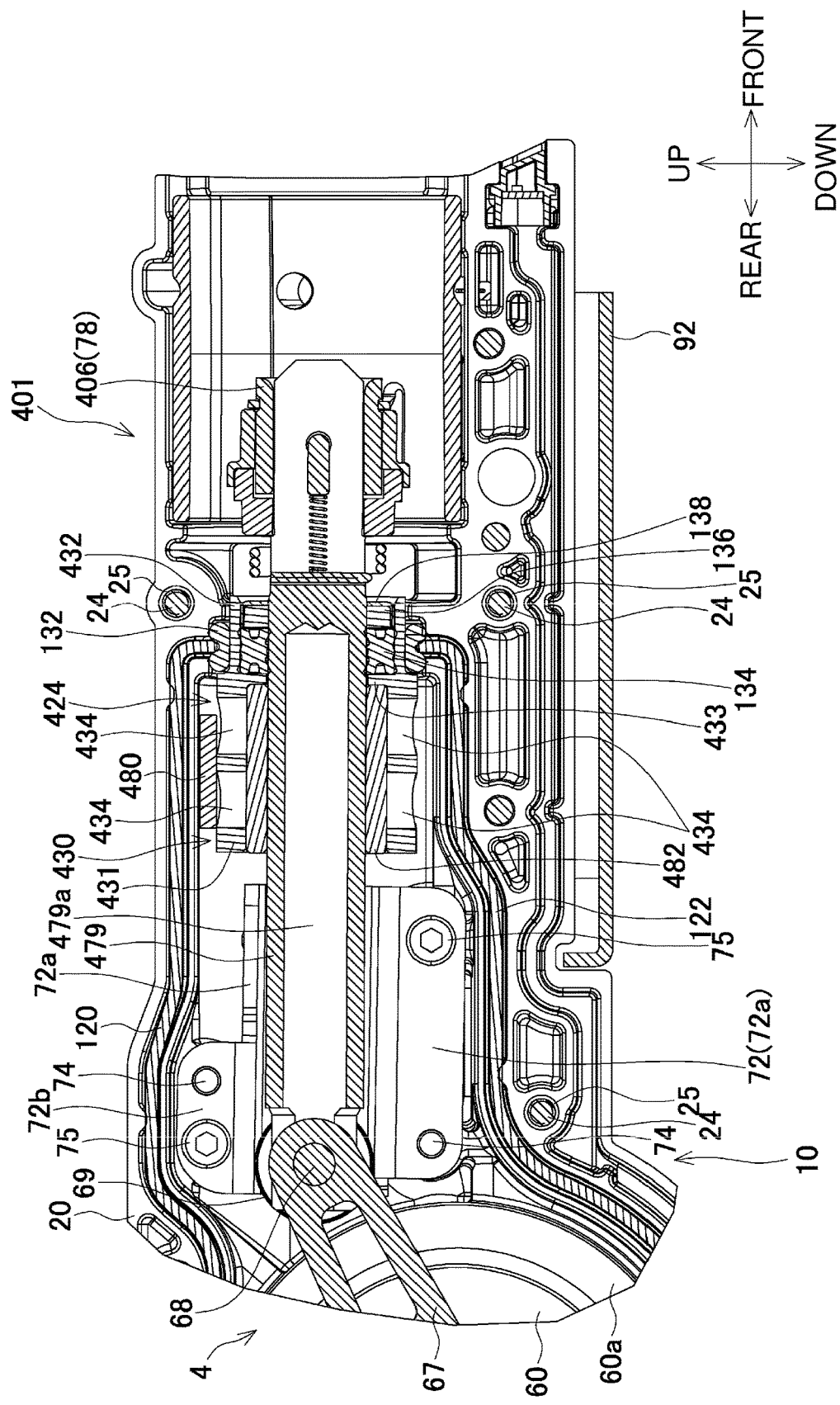
FIG. 14 is a view of a reciprocating saw according to a fourth embodiment corresponding to FIG. 4.
Figure 15:
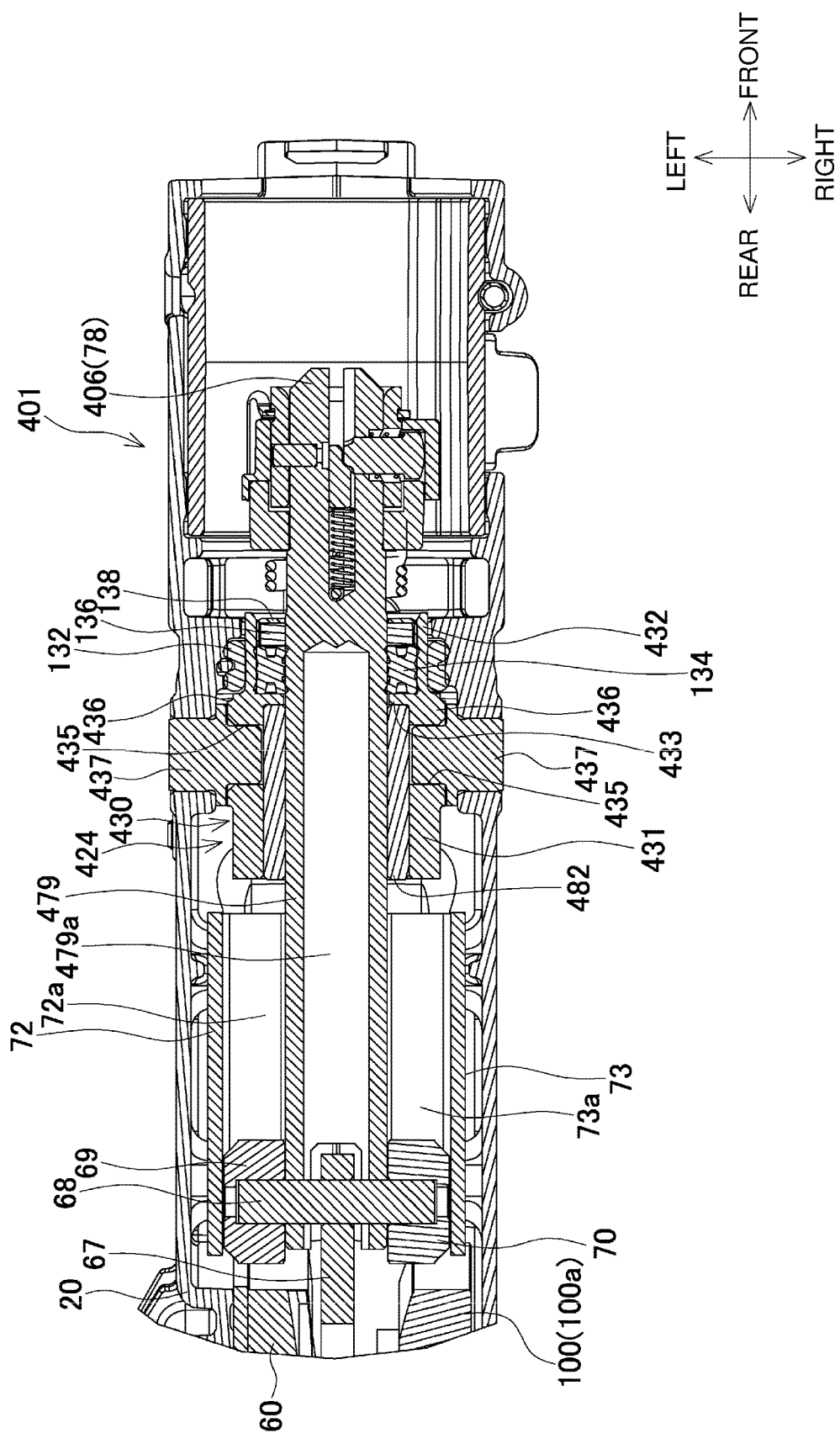
FIG. 15 is a view of the reciprocating saw according to the fourth embodiment corresponding to FIG. 5.

FIG. 14 is a view of a reciprocating saw 401 according to a fourth embodiment corresponding to FIG. 4. FIG. 15 is a view of the reciprocating saw 401 corresponding to FIG. 5.

The reciprocating saw 401 according to the fourth embodiment differs from the reciprocating saw in the first embodiment in a slider and a supporting mechanism for the slider. The components and portions that are the same as those in the first embodiment are given the same reference numerals, and will not be described.

A slider 406 according to the fourth embodiment includes the blade clamp 78 and a slider base 479. The slider 406 is connected to the reciprocating conversion mechanism 4 and reciprocates.

The slider base 479 has an inner bore 479a without the felt piece 80.

The slider base 479 is supported in a manner movable back and forth by a slider guide 424 with an oilless bearing 482.

Figure 16:
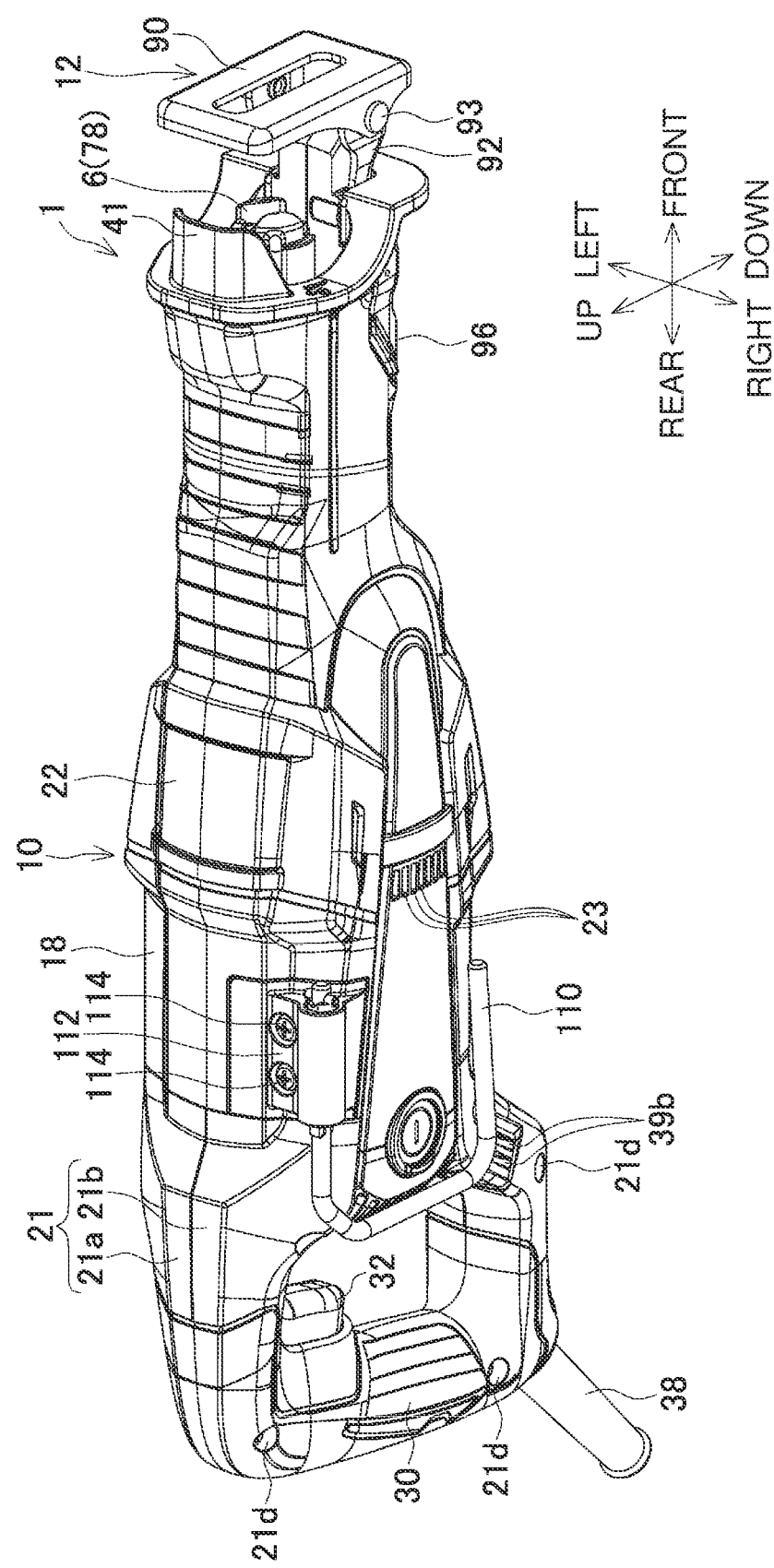
FIG. 16 is an exploded perspective view of a slider and a slider guide in the reciprocating saw according to the fourth embodiment.

As shown in FIG. 16, the slider guide 424 includes a cylindrical slider guide case 430 with an axis extending in the front-rear direction.

The slider guide case 430 is a thermally treated cut material. The slider guide case 430 includes a cylindrical case body 431 and a sealing portion 432. The sealing portion 432 is a cylinder protruding frontward from the front end of the case body 431. An annular rib 433 protrudes radially inward from the front inner surface of the case body 431.

The outer ring 132 is in contact with the outer surface of the sealing portion 432. The inner ring 134, the inner front ring 136, and the washer 138 are arranged inside the sealing portion 432. The slider guide 424 includes the sealing portion 432 and has the same sealing capability as the seal member 124 according to the first embodiment. The slider guide 424 may not have the sealing capability. The seal member 124 may be provided separately.

The oilless bearing 482 is press-fitted into the case body 431. The oilless bearing 482 is formed from a sintered material, instead of from a cut material. The oilless bearing 482 (lubricant-passage member) is formed from a sintered material, or specifically a porous material with numerous pores. This structure allows at least part of a lubricant, such as lubricating oil in grease, to enter and pass through the pores. The slider guide case 430 (cut material) has a hardness higher than the oilless bearing 482 formed from a sintered material.

The inner diameter of the oilless bearing 482 is the same as the outer diameter of the slider base 479. The front surface of the oilless bearing 482 is in contact with the rear surface of the rib 433. The oilless bearing 482 may be fastened to the case body 431 by welding or with screws.

The case body 431 has, on its top and bottom, multiple (two) grease reservoirs 434 (first lubricant reservoir) aligned in the front-rear direction. Each grease reservoir 434 is a vertical hole. Each grease reservoir 434 communicates with the outer surface of the oilless bearing 482. A single grease reservoir 434 or three or more grease reservoirs 434 may be arranged in the front-rear direction. The grease reservoirs 434 may be arranged laterally on the top or the bottom of the case body 431, or may be arranged only on the top or the bottom of the case body 431, or may be arranged on the right and left of the case body 431.

The case body 431 includes right and left fixtures 436 protruding radially outward, each having a fixing hole portion 435 in the center. The slider guide case 430 is fastened to the gear housing 20 with pins 437. Each pin 437 extends laterally, and is placed in the right or left fixing hole portion 435 having a laterally extending fixing hole.

A prismatic felt piece 480 (a lubricant-impregnated member and a second lubricant reservoir) is located above the pair of grease reservoirs 434 on the top of the case body 431. The felt piece 480 and the grease reservoirs 434 are arranged opposite to the downward edge of the blade attached to the blade clamp 78. The felt piece 480 may be located below the grease reservoirs 434 at the bottom instead of or in addition to the felt piece 480 located above the grease reservoirs 434 at the top. The felt piece 480 may be eliminated.

The gear housing 20, which is sealed with the upper sealant 120, the lower sealant 122, the motor front housing 20c, and the sealing portion 432, includes a predetermined amount of grease (e.g., an enough amount to cover the inner wall of the gear housing 20 and the outer walls of internal components of the gear housing 20). The grease is applied to fill the grease reservoirs 434. The grease reservoirs 434 store the grease.

Lubricating oil in the grease lubricates the components in the gear housing 20. The lubricating oil in the grease lubricates the inner wall (a slide portion) of the oilless bearing 482. Unless externally replenished with lubricating oil, the lubricating oil decreases and is finally used up by the sliding portions (causing oil film breakdown or lubricant breakdown). The slide portion may be unlubricated due to oil film breakdown, and may have failures in sliding. Either heat generation or seizure or both may cause failures in at least the slide portions or in portions adjacent to the slide portions.

Without the grease reservoirs 434, the grease or its lubricating oil is less likely to pass through the slider guide case 430 as a cut material and the oilless bearing 482 press-fitted in the slider guide case 430 having the rear surface alone exposed. Thus, when the reciprocating saw 1 continues to operate for a predetermined duration or longer, the inner surface of the oilless bearing 482 may be insufficiently replenished with grease or its lubricating oil, and may cause oil film breakdown.

In contrast, the reciprocating saw 401 according to the present embodiment includes the grease reservoirs 434, which cause part of the outer curved surface of the oilless bearing 482 to be exposed, thus allowing grease to come in contact with the outer curved surface of the oilless bearing 482. The oilless bearing 482 is formed from a porous sintered material. This structure allows lubricating oil in grease on the outer curved surface of the oilless bearing 482 to be impregnated into the oilless bearing 482 and reach its inner surface. This prevents oil film breakdown on the inner surface of the oilless bearing 482.

The felt piece 480 impregnated with grease is located adjacent to the grease reservoirs 434 described above. Thus, the felt piece 480 serves as a lid for the grease reservoirs 434 to prevent grease from leaking from the grease reservoirs 434.

The reciprocating saw 401 according to the present embodiment includes the motor 42, the reciprocating conversion mechanism 4 that converts the rotation of the motor 42 to reciprocation, the slider 406 connected to the reciprocating conversion mechanism 4 for reciprocation, and the slider guide 424 supporting the slider 406 in a reciprocable manner. The slider guide 424 includes the oilless bearing 482 in contact with the slider 406 and through which lubricating oil in grease can pass. The oilless bearing 482 is adjacent to the grease reservoirs 434 that can store grease. This structure easily supplies the reciprocating conversion mechanism 4 with lubricating oil in grease to prevent oil film breakdown, thus preventing at least malfunctioning or failure.

The slider guide 424 includes the slider guide case 430. The slider guide case 430 includes the grease reservoirs 434. This structure allows the slider guide case 430 to firmly hold the oilless bearing 482 while preventing oil film breakdown in the reciprocating conversion mechanism 4.

The slider guide case 430 is formed from a material harder than the oilless bearing 482. This structure allows the harder slider guide case 430 to firmly hold the oilless bearing 482 while preventing oil film breakdown in the reciprocating conversion mechanism 4 by increasing the degree of impregnation of lubricating oil into the oilless bearing 482 supporting the reciprocating conversion mechanism 4.

The oilless bearing 482 serves as a lubricant-passage member, and is press-fitted into the slider guide case 430.

This simple structure achieves both the high strength of the slider guide 424 and the replenishment of grease (lubricating oil).

The blade attachable to the slider 406 is single-edged. The grease reservoirs 434 are located opposite to the edge of the blade. This structure supplies more grease (lubricating oil) to the portion of the oilless bearing 482 opposite to the blade edge, which is likely to receive a greater force than its portion adjacent to the blade edge during the cutting operation of a workpiece.

The felt piece 480 is located adjacent to the oilless bearing 482. This structure prevents grease from leaking from the grease reservoirs 434, allowing the replenishment of the oilless bearing 482 with lubricating oil over a longer period of time.

The fourth embodiment and its modifications may be modified in the same manner as the first to third embodiments as appropriate.

The felt piece 480 may be, for example, a cylindrically bent felt sheet.

Each grease reservoir 434 may have a cross section in the shape of an ellipse, a polygon, or a slit instead of a circle, or may have a different cross section in the shape selected from these. The grease reservoirs 434 may be flared or tapered to have a diameter increasing or decreasing radially outward.

The upper slider support roller 82 and the lower slider support roller 83 according to the first embodiment may serve as lubricant-passage members instead of or in addition to the oilless bearing 482.

The gear housing 20 may include a rib protruding internally from its inner surface to hold the felt piece 480 in a predetermined space or at a fixed position.

The slider guide case 430 may have the fixing hole portions 435 receiving the pins 437, which are to be held on the gear housing 20. The fixing hole portions 435 alone in the slider guide case 430 may be formed from a material harder than the oilless bearing 482. The slider guide case 430 may include pin receiving members including the fixing hole portions 435, and a slider guide case body, and may be formed by press-fitting the pin receiving members into the slider guide case body. In this case as well, the slider guide case 430 is stably held on the gear housing 20 (housing 10). This structure reduces wear between the oilless bearing 482 and the slider 406, thus allowing accurate and stable operation.

Instead of or in addition to press-fitting, bonding may be used.

Fifth Embodiment

Figure 17:
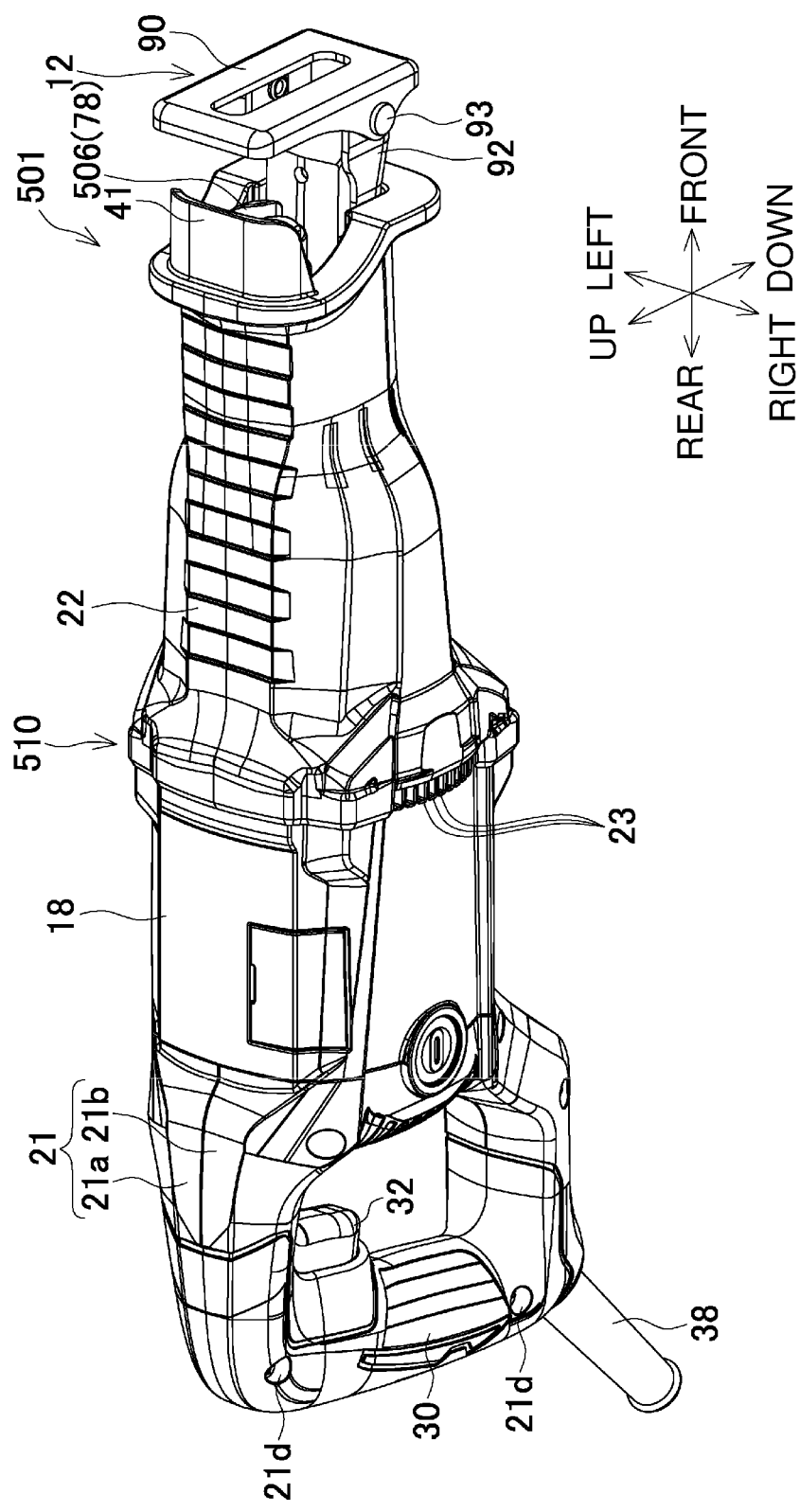
FIG. 17 is a perspective view of a reciprocating saw according to a fifth embodiment.
Figure 18:
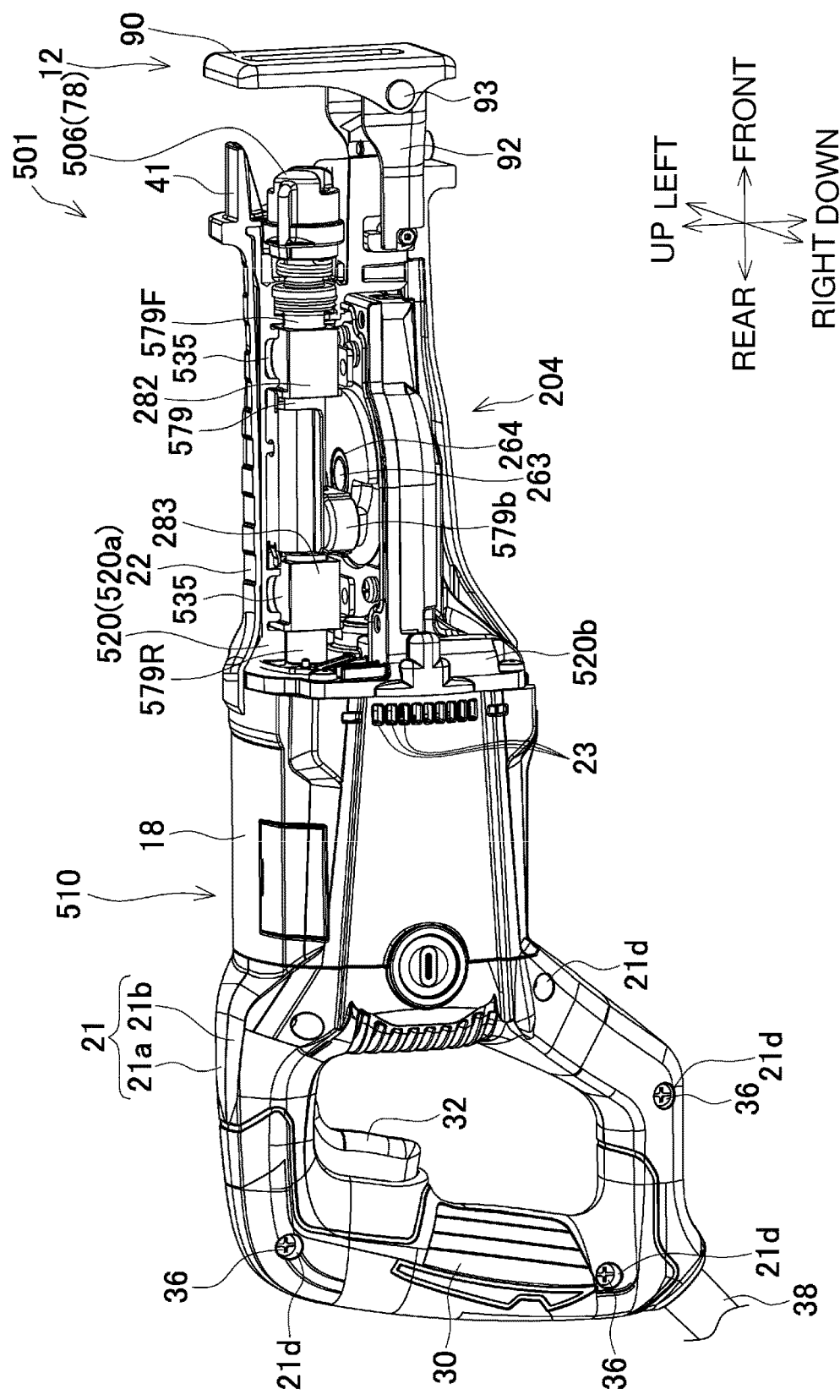
FIG. 18 is a perspective view of FIG. 17 with a cover partially removed.
Figure 19:
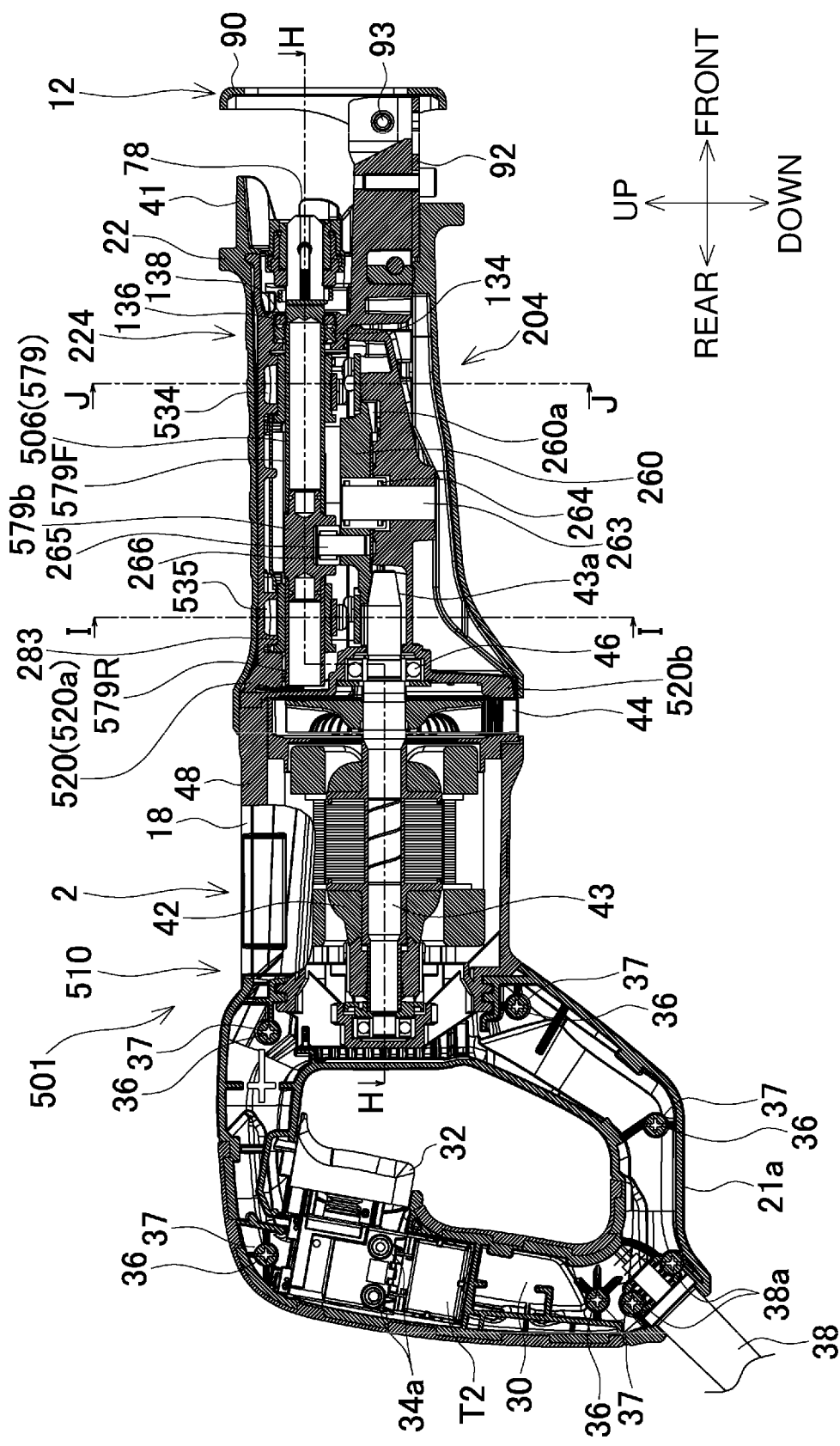
FIG. 19 is a longitudinal central sectional view of FIG. 17.
Figure 20:
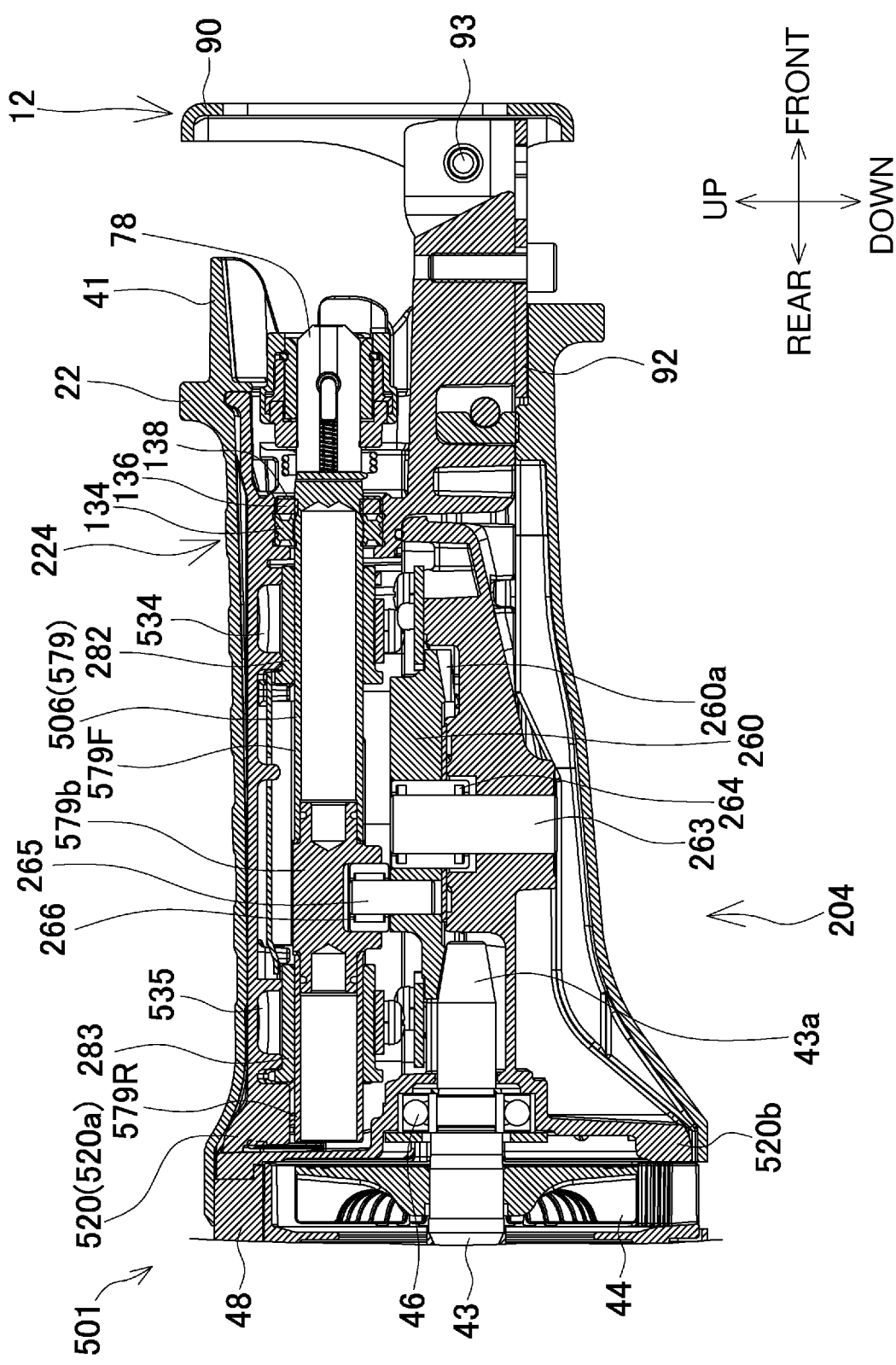
FIG. 20 is an enlarged partial view of a front portion in FIG. 19.
Figure 21:
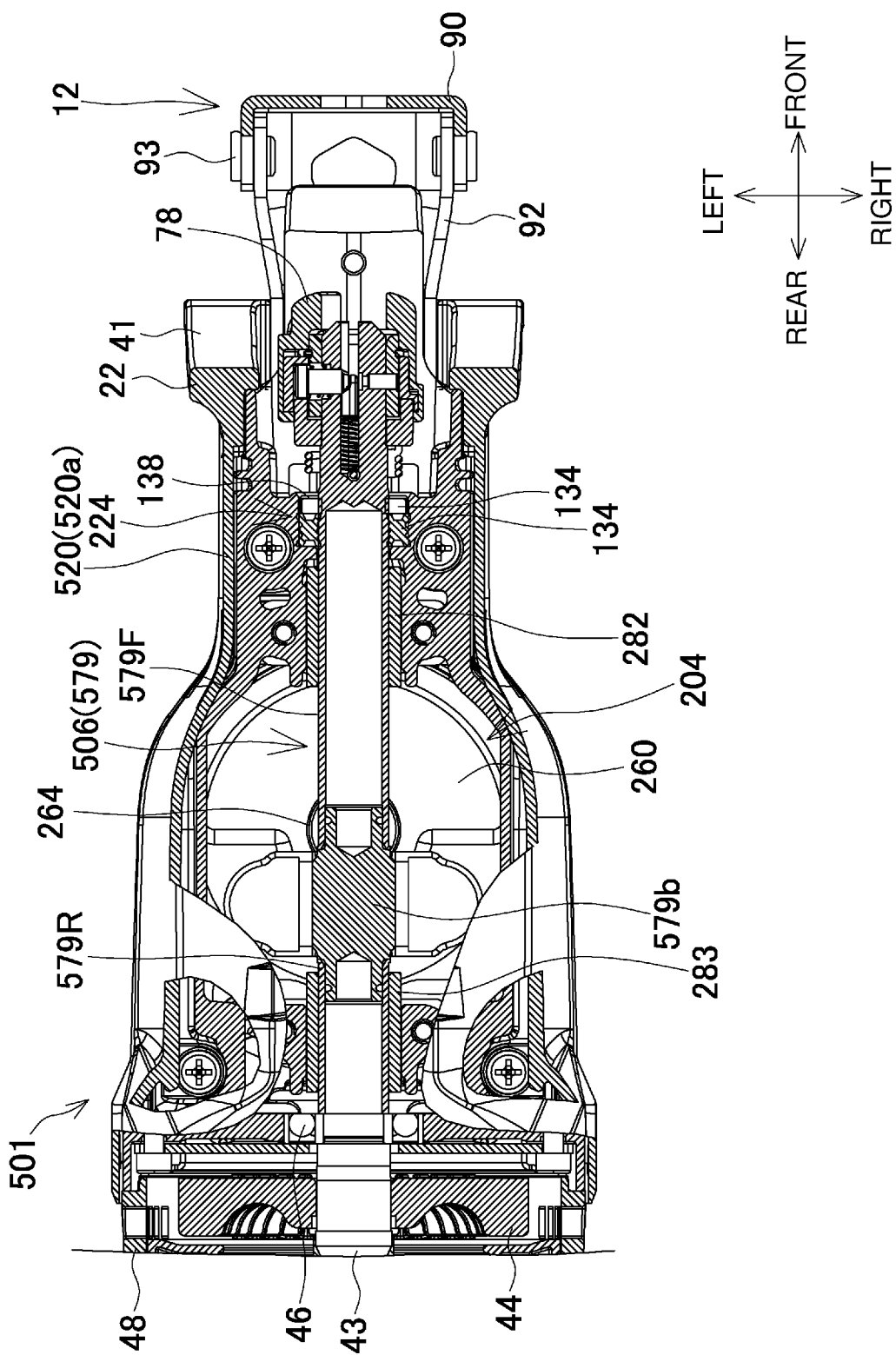
FIG. 21 is a cross-sectional view taken along line H-H in FIG. 19.
Figure 22:
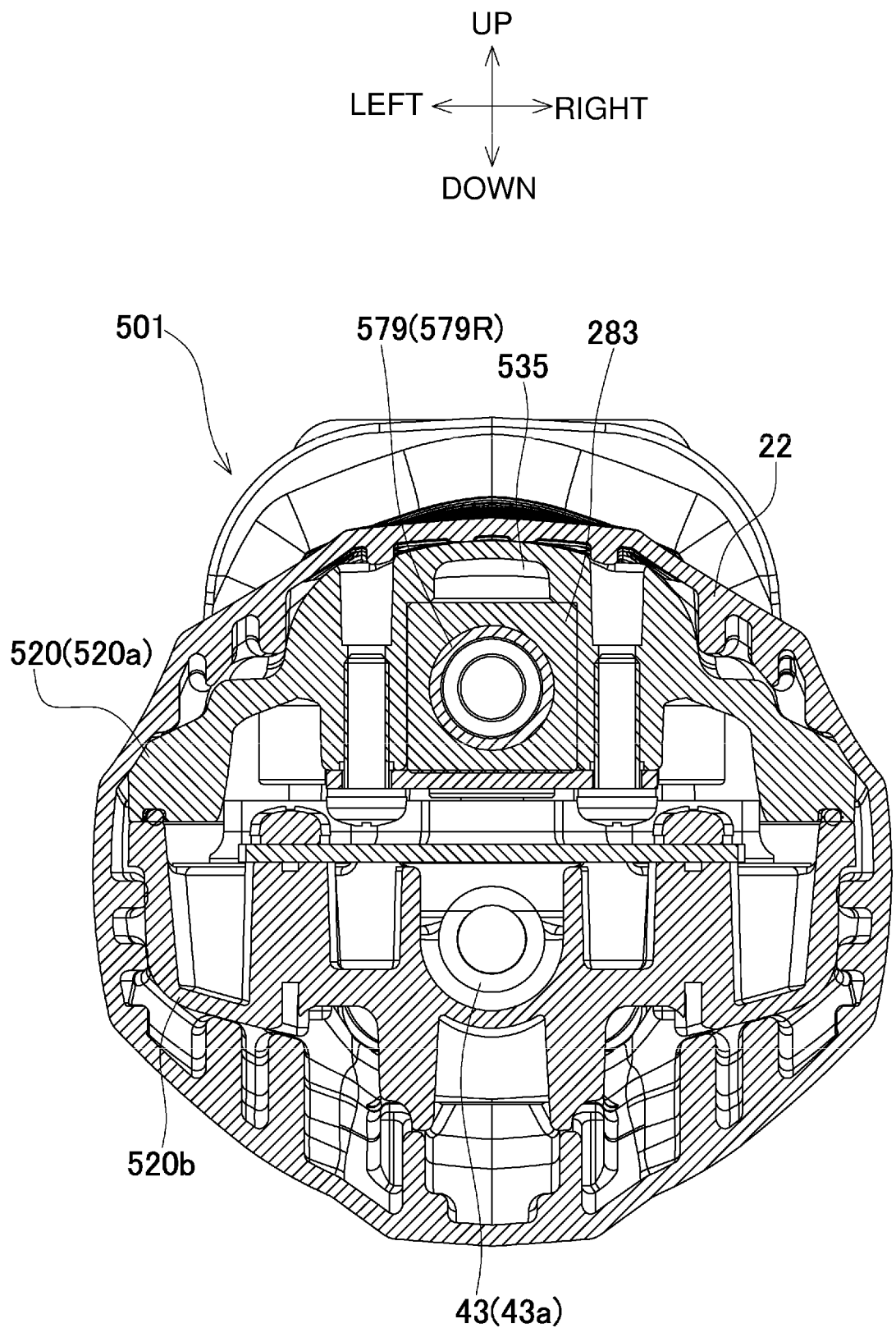
FIG. 22 is a cross-sectional view taken along line I-I in FIG. 19.
Figure 23:
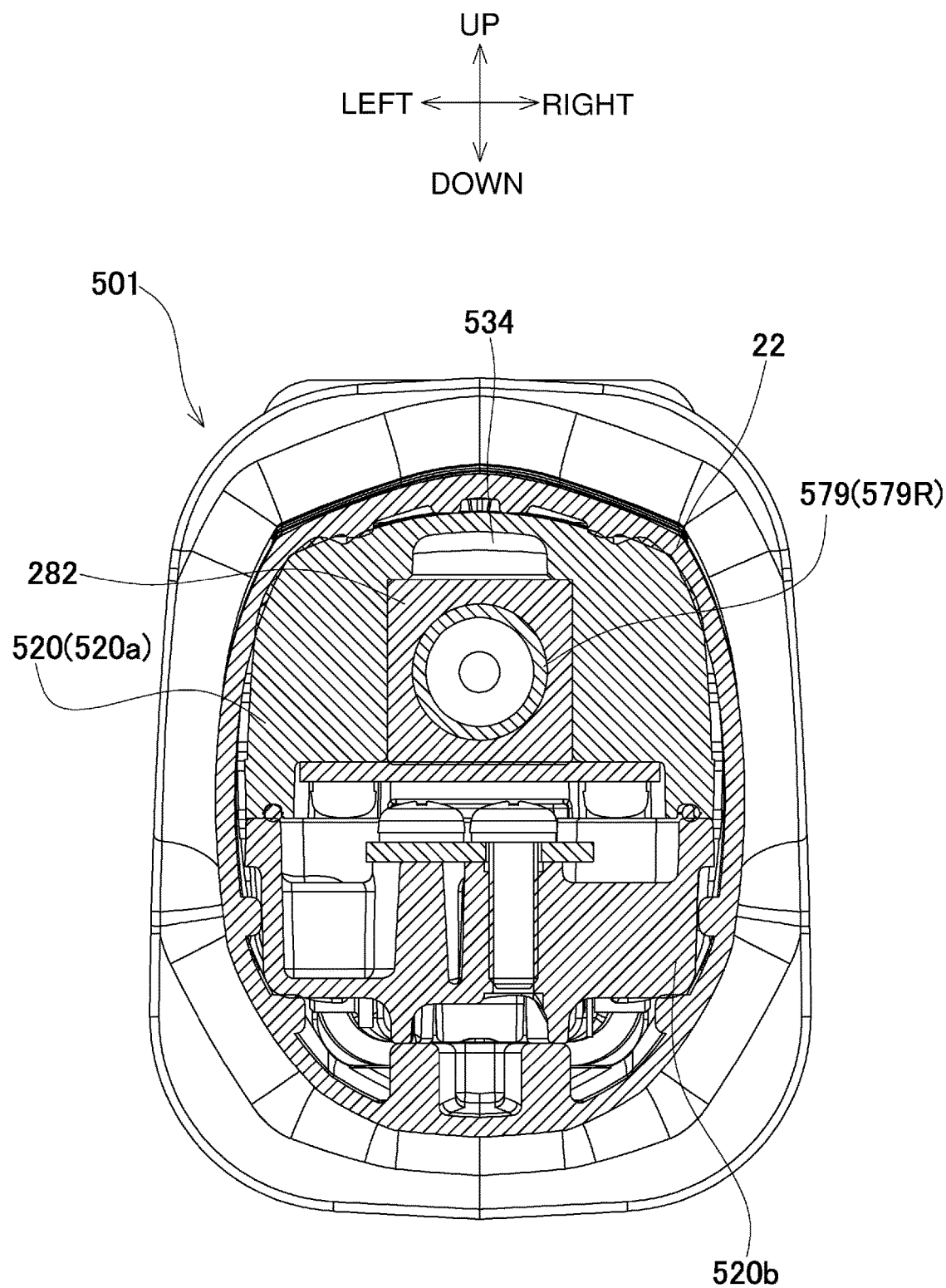
FIG. 23 is a cross-sectional view taken along line J-J in FIG. 19.

FIG. 17 is a perspective view of a reciprocating saw 501 according to a fifth embodiment. FIG. 18 is a perspective view of the reciprocating saw 501 with a cover partially removed. FIG. 19 is a longitudinal central sectional view of the reciprocating saw 501. FIG. 20 is an enlarged partial view of a front portion in FIG. 19. FIG. 21 is a cross-sectional view taken along line H-H in FIG. 19. FIG. 22 is a cross-sectional view taken along line I-I in FIG. 19. FIG. 23 is a cross-sectional view taken along line J-J in FIG. 19.

The reciprocating saw 501 according to the fifth embodiment differs from the reciprocating saw in the second embodiment in a slider and a portion adjacent to a supporting mechanism for the slider. The components and portions that are the same as those in the second embodiment are given the same reference numerals, and will not be described.

The cover 22 in the fifth embodiment includes the blade clamp cover 41 in the same manner as in the first embodiment.

The reciprocating conversion mechanism 204 reciprocates a slider 506 including a slider base 579 according to the fifth embodiment. The slider base 579 includes a connecting member 579b, a front slider base 579F, and a rear slider base 579R. The connecting member 579b opens downward to receive the bearing 266. The front slider base 579F is hollow, and extends frontward from the front end of the connecting member 579b. The rear slider base 579R is hollow, and extends rearward from the rear end of the connecting member 579b.

The front slider base 579F and the rear slider base 579R do not receive the felt piece 80 in their hollows.

The front slider base 579F is supported by the front support cylinder 282 in a manner movable forward and rearward. The rear slider base 579R is supported by the rear support cylinder 283 in a manner movable back and force.

The front support cylinder 282 and the rear support cylinder 283 are fastened with screws on an upper gear housing 520a in the gear housing 520 having a vertically half-split structure (including the upper gear housing 520a and a lower gear housing 520b) in a housing 510.

A grease reservoir 534 (lubricant reservoir) for storing grease is located above and adjacent to the front support cylinder 282. A grease reservoir 535 (lubricant reservoir) for storing grease is located above and adjacent to the rear support cylinder 283.

The grease reservoir 534 is located in the upper gear housing 520a. The grease reservoir 534 is a domical chamber (space) located above the front support cylinder 282. The grease reservoir 534 is defined internally by an annular wall in contact with the upper surface of the front support cylinder 282.

The grease reservoir 535 is located in the upper gear housing 520a. The grease reservoir 535 is a domical chamber (space) above the rear support cylinder 283. The grease reservoir 535 is defined internally by an annular wall in contact with the upper surface of the rear support cylinder 283.

When the upper gear housing 520a does not include the grease reservoirs 534 and 535 defined in the walls, grease enters from only the rear end of the front support cylinder 282 and the front end of the rear support cylinder 283 exposed to an internal space of the upper gear housing 520a, and is thus less likely to pass through the front support cylinder 282 or the rear support cylinder 283 (oilless bearing). Thus, when the reciprocating saw 1 operates for a certain duration or longer, the inner surfaces of the front support cylinder 282 and the rear support cylinder 283 may be insufficiently replenished with lubricating oil in grease supplied externally from these, and thus cause oil film breakdown.

In contrast, the reciprocating saw 501 includes the grease reservoirs 534 and 535 that are filled with grease at, for example, manufacture, thus allowing the upper surfaces of the front support cylinder 282 and the rear support cylinder 283 to come in contact with grease. The front support cylinder 282 and the rear support cylinder 283 are formed from a porous sintered material. This structure allows grease on the upper surfaces of the front support cylinder 282 and the rear support cylinder 283 to be impregnated into the front support cylinder 282 and the rear support cylinder 283 and reach their inner surfaces. This prevents oil film breakdown on the inner surfaces of the front support cylinder 282 and the rear support cylinder 283.

The reciprocating saw 501 according to the present embodiment includes the motor 42, the reciprocating conversion mechanism 204 that converts the rotation of the motor 42 to reciprocation, the slider 506 connected to the reciprocating conversion mechanism 204 for reciprocation, and the front support cylinder 282 and the rear support cylinder 283 (slider guide) supporting the slider 506 in a reciprocable manner. The slider guide in contact with the slider 506 includes the front support cylinder 282 and the rear support cylinder 283 that allow passage of lubricating oil in grease. The front support cylinder 282 and the rear support cylinder 283 are adjacent to the grease reservoirs 534 and 535 for storing grease. This structure easily supplies grease to the reciprocating conversion mechanism 204 to prevent oil film breakdown, thus preventing at least malfunctioning or failure.

The gear housing 520 internally includes oilless bearings as the front support cylinder 282 and the rear support cylinder 283, and the grease reservoirs 534 and 535 located in the gear housing 520. This structure allows simple installation of the front support cylinder 282 and the rear support cylinder 283 for supporting the slider 506, and allows the compact arrangement of the grease reservoirs 534 and 535 integral with the gear housing 520 to lubricate the front support cylinder 282 and the rear support cylinder 283 over a longer period of time.

The fifth embodiment and its modifications may be modified in the same manner as the first to fourth embodiments as appropriate.

The grease reservoirs 534 and 535 may each be a ring-shaped slit on a wall, or may have a prismatic internal space. The grease reservoirs 534 and 535 may each have a ring-shaped elastic member (O-ring) on the annular wall. The O-ring is exposed to and in contact with the front support cylinder 282 or the rear support cylinder 283, preventing grease from leaking from the grease reservoir 534 or 535 (as a sealant for grease).

A felt piece may be located inside or adjacent to at least the grease reservoir 534 or the grease reservoir 535. At least the grease reservoir 534 or the grease reservoir 535 may be eliminated.

The upper slider support roller 82 and the lower slider support roller 83 according to the first embodiment may serve as lubricant-passage members instead of or in addition to the front support cylinder 282 and the rear support cylinder 283.

REFERENCE SIGNS LIST 1, 201, 301, 401, 501 reciprocating saw (reciprocating cutting tool or reciprocating tool)
4, 204, 304 reciprocating conversion mechanism
6, 206, 306, 406, 506 slider
20, 220, 520 gear housing (housing)
42 motor
60 gear (first gear)
67 connecting rod
68 pin
69 left guide roller (guide roller)
70 right guide roller (guide roller)
79a, 279a, 379a inner bore (hollow)
80, 280, 380, 480 felt piece (lubricant-impregnated member)
260 gear (second gear)
265 eccentric shaft
282 front support cylinder (lubricant-passage member or oilless bearing)
283 rear support cylinder (lubricant-passage member or oilless bearing)
366 boss sleeve
366a sloping cylinder surface
368 arm
424 slider guide
430 slider guide case
434, 534, 535 grease reservoir (lubricant reservoir)
484 oilless bearing (lubricant-passage member)

What is claimed is:

1. A reciprocating tool, comprising:
   a motor including a motor shaft;
   a reciprocating conversion mechanism connected to the motor shaft and configured to convert rotation of the motor shaft to reciprocation motion;
   a slider connected to the reciprocating conversion mechanism and configured to reciprocate due to the reciprocation motion of the reciprocating conversion mechanism; and
   a slider guide supporting the slider in a reciprocable manner such that the slider is slidably received in the slider guide, the slider guide including
   a porous oilless bearing in contact with the slider, and
   a slider guide case including a lubricant reservoir located adjacent to the oilless bearing to store a lubricant,
   wherein the oilless bearing is press-fitted into the slider guide case, and the oilless bearing is formed from sintered material and configured to allow passage of at least part of the lubricant through pores of the oilless bearing.

2. The reciprocating tool according to claim 1, wherein at least a portion of the slider guide case is made of material harder than the oilless bearing.

3. The reciprocating tool according to claim 2, further comprising:
   a single-edged blade attachable to the slider,
   wherein the lubricant reservoir is located opposite to an edge of the blade.

4. The reciprocating tool according to claim 1, wherein the slider guide case is made of material harder than the oilless bearing.

5. The reciprocating tool according to claim 4, further comprising:
   a single-edged blade attachable to the slider,
   wherein the lubricant reservoir is located opposite to an edge of the blade.

6. The reciprocating tool according to claim 1, further comprising:
   a housing accommodating the slider guide, wherein
   the slider guide case includes a fixing hole portion receiving a pin fastening the slider guide case to the housing, and
   the fixing hole portion in the slider guide case is made of material harder than the oilless bearing.

7. The reciprocating tool according to claim 6, wherein:
   the pin fastening the slider guide case to the extends laterally; and
   the fixing hole portion extends laterally.

8. The reciprocating tool according to claim 1, further comprising:
   a single-edged blade attachable to the slider,
   wherein the lubricant reservoir is located opposite to an edge of the blade.

9. The reciprocating tool according to claim 1, further comprising:
   a felt piece located adjacent to the oilless bearing.

10. A reciprocating tool, comprising:
a motor including a motor shaft having a rotation axis;
a reciprocating conversion mechanism connected to the motor shaft and configured to convert rotation of the motor shaft to reciprocation motion;
a slider connected to the reciprocating conversion mechanism and configured to reciprocate due to the reciprocation motion of the reciprocating conversion mechanism in a reciprocation direction parallel to the rotation axis;
a slider guide (i) supporting the slider in a reciprocal manner and (ii) in contact with an outer periphery of the slider, wherein the slider guide is a cylinder having a central axis coaxial with the reciprocating axis; and
a housing accommodating the slider guide, and including a lubricant reservoir (1) to store a lubricant and (2) located along an outer cylindrical periphery of the slider guide in a direction perpendicular to the reciprocation direction
wherein the slider guide includes a porous oilless bearing formed from sintered material and configured to allow passage of at least part of the lubricant through pores of the oilless bearing.

11. The reciprocating tool according to claim 10, wherein the lubricant reservoir is a space defined in the housing.

12. The reciprocating tool according to claim 10 wherein:
the slider guide has a front portion and a rear portion; and
the lubricant reservoir includes a first portion at the front portion and a second portion at the rear portion.

* * * * *